United States Patent
Twist et al.

(10) Patent No.: US 10,643,257 B2
(45) Date of Patent: May 5, 2020

(54) INTEGRATED AND INTELLIGENT DONATION OPTIONS

(71) Applicant: Facebook, Inc., Menlo Park, CA (US)

(72) Inventors: Jonjo Twist, Redmond, WA (US); Nathan Ackerman, Seattle, WA (US); John Lawrence Connuck, Seattle, WA (US); Lisa Jones, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 317 days.

(21) Appl. No.: 15/372,049

(22) Filed: Dec. 7, 2016

(65) Prior Publication Data

US 2018/0158114 A1    Jun. 7, 2018

(51) Int. Cl.
*G06Q 30/02* (2012.01)
*G06Q 50/00* (2012.01)

(52) U.S. Cl.
CPC ......... *G06Q 30/0279* (2013.01); *G06Q 50/01* (2013.01)

(58) Field of Classification Search
CPC combination set(s) only.
See application file for complete search history.

(56) References Cited

U.S. PATENT DOCUMENTS

| | | | |
|---|---|---|---|
| 2002/0111904 A1* | 8/2002 | Gruber | G06Q 20/10 705/39 |
| 2005/0065809 A1* | 3/2005 | Henze | G06Q 10/06393 705/7.39 |
| 2009/0094093 A1* | 4/2009 | Phan | G06O 30/02 705/14.66 |
| 2015/0356624 A1* | 12/2015 | Itwaru | G06Q 20/3272 705/14.66 |

OTHER PUBLICATIONS

"Choosing the Right Giving Levels for Your Online Donation Form," 2013, [retrieved on May 20, 2019]. Retrieved from the Internet (hereinafter referred to as Classy.org) (Year: 2013).*

* cited by examiner

*Primary Examiner* — Julie M Shanker
(74) *Attorney, Agent, or Firm* — Keller Jolley Preece

(57) ABSTRACT

The present disclosure is directed toward systems and methods for customizing an electronic communication to include an option to make an online donation to a charitable cause, based on evaluating donation histories, and providing the customized communication to one or more recipients. The systems and methods described herein further customize electronic communications for multiple recipients such that the systems and methods provide each recipient with an option to contribute that is based on the individual donation history of the recipient.

20 Claims, 10 Drawing Sheets

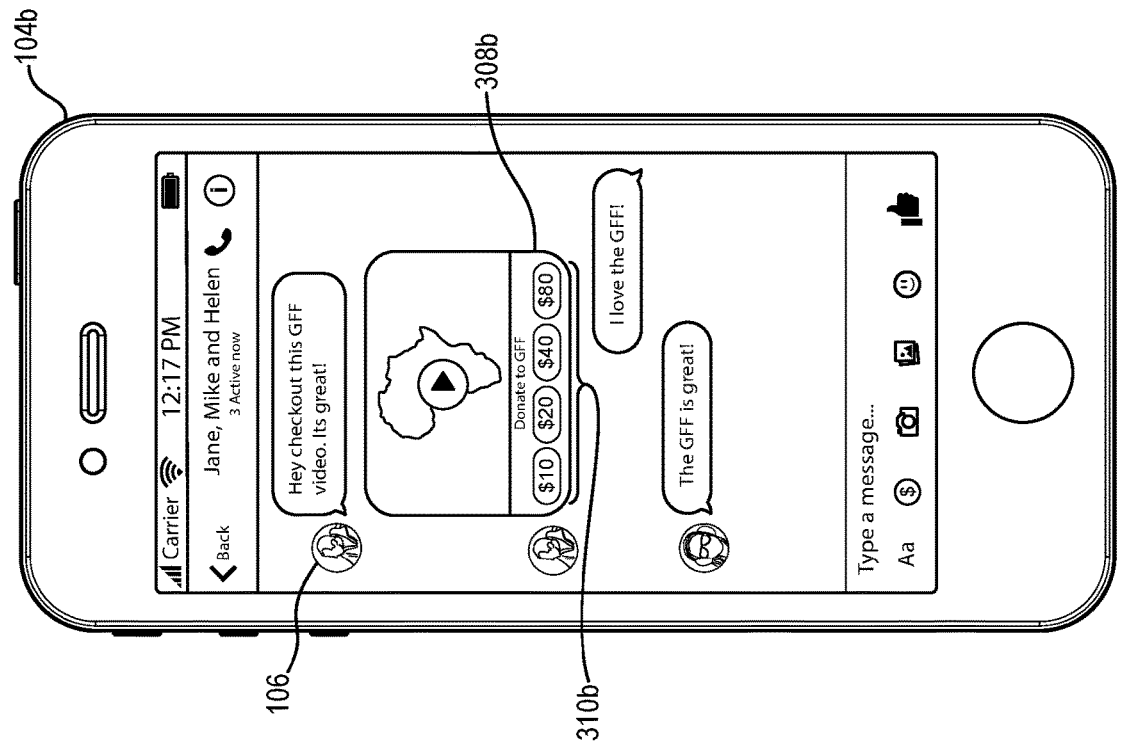
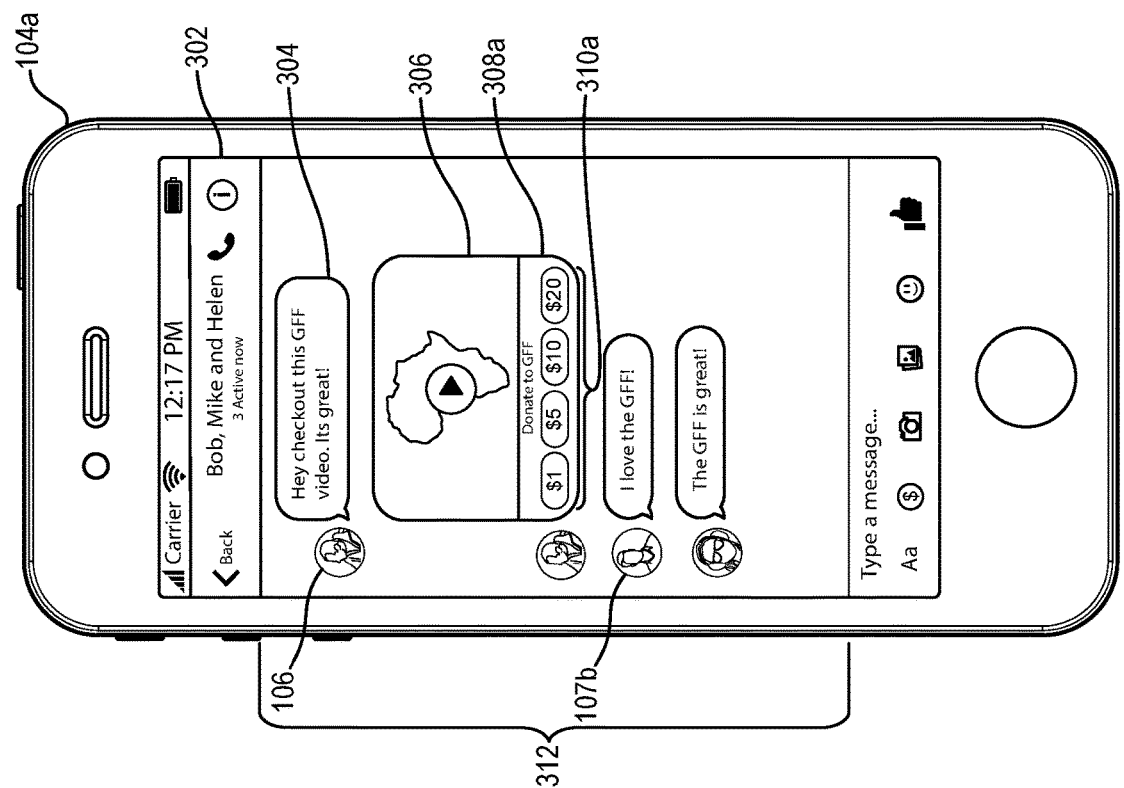
Fig. 3B
Fig. 3A

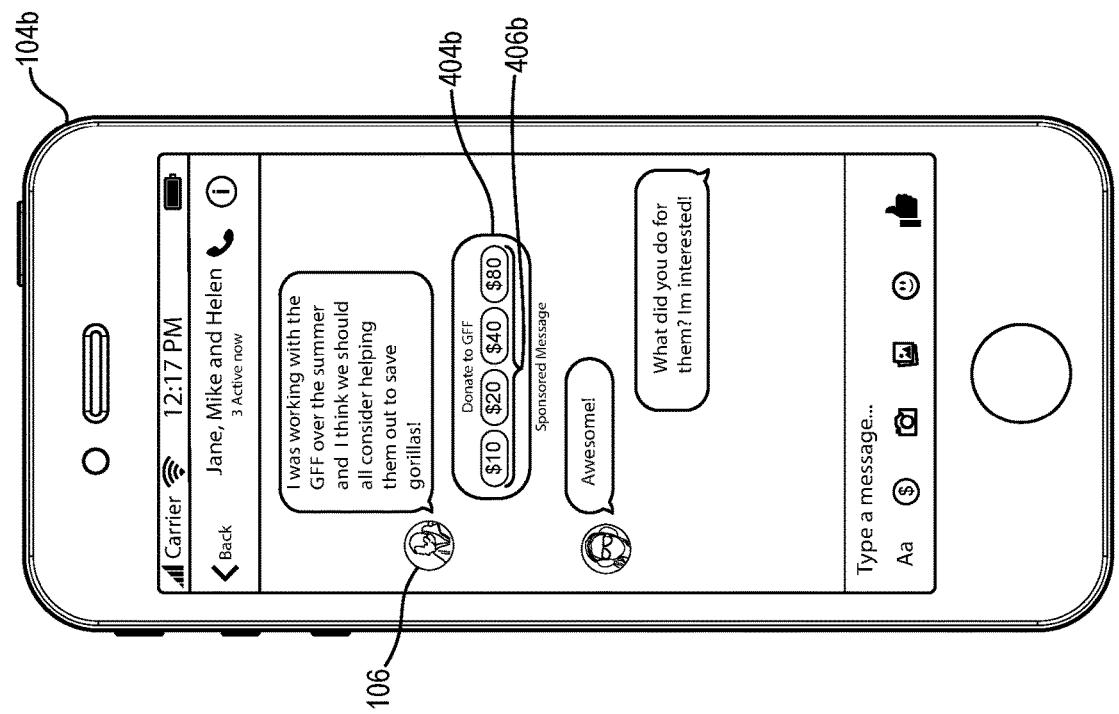
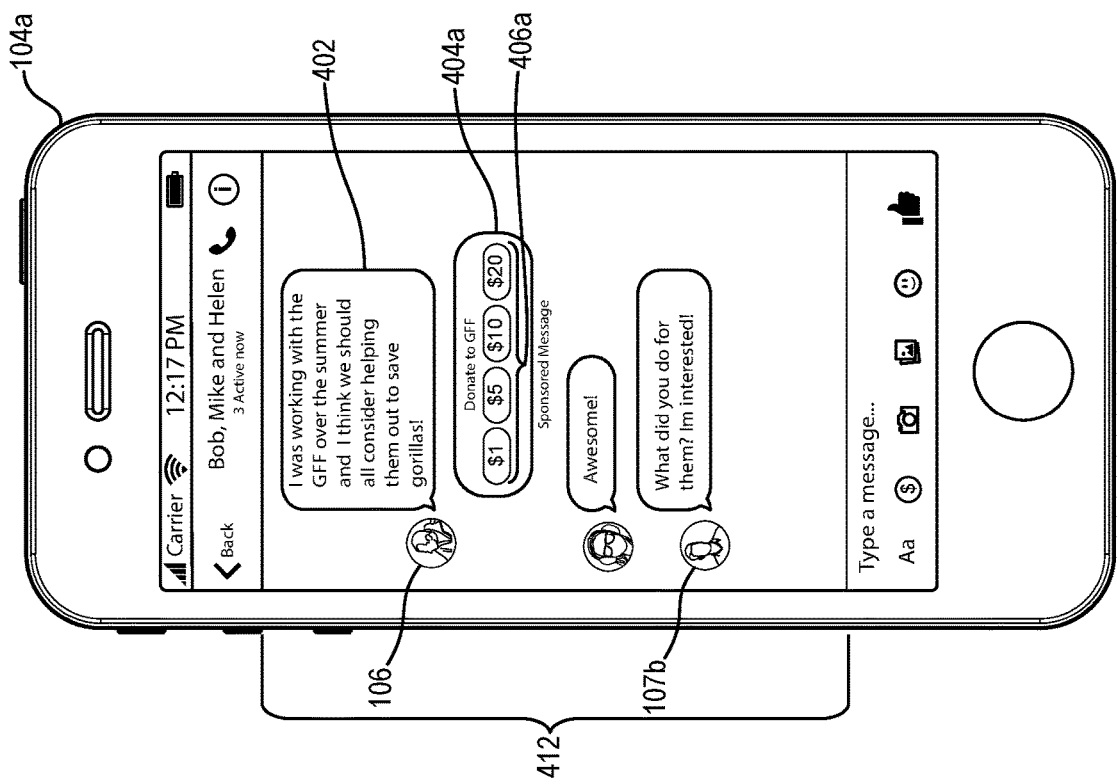
Fig. 4B
Fig. 4A

INTEGRATED AND INTELLIGENT DONATION OPTIONS

CROSS REFERENCE TO RELATED APPLICATIONS

N/A

BACKGROUND

Charitable organizations require funds to operate, and many charitable organizations have websites set up to receive donations. However, conventional online donation systems do not reach out to potential donors effectively. Instead, conventional online donation generally requires donors to purposefully visit a website of a charitable organization. Websites of charitable organizations receive less Internet traffic than other sites. With only these conventional online donation systems, charities miss out on potential contributions from individuals who do not specifically seek out the websites of those charities to make such a contribution. Additionally, charities miss out on those individuals who do not already have the intention to donate but might otherwise be persuaded to do so by a friend or after reading an inspiring message from a charitable organization. Conventional online charitable donation systems can be cumbersome and not easily accessible.

Furthermore, conventional online charitable donation systems typically require user interactions with multiple websites or applications. In other words, if a user wants to donate to a particular charitable organization while also chatting with members of the charity or friends who have also donated to the charity to ask questions, the user would be required to access both the website or application of the charitable organization to donate as well as a chat room or other messaging application to communicate with others. Thus, conventional online charitable donation systems are limited in functionality and require users to expend unnecessary effort to accomplish tasks related to contributing to charitable organizations.

Thus, there are several disadvantages with regard to conventional online donation methods and systems.

SUMMARY

One or more embodiments described herein provide benefits and solve one or more of the foregoing or other problems in the art with systems and methods for an integrated online donation option. In particular, one or more embodiments described herein describe systems and methods for integrating online donations within a social networking system. In accordance with one or more disclosed embodiments, the systems and methods disclosed herein customize an electronic communication within a social networking system to include an option to contribute to a charitable cause. In particular, the option to contribute is a user-selectable element provided in tandem with the electronic communication. The systems and methods evaluate donation histories and analyze content of the electronic communication to determine distinct donation quantities to provide to the message recipient in the selectable option to contribute.

Additionally, one or more embodiments described herein provide benefits and solve one or more of the foregoing or other problems in the art with systems and methods for an integrated online donation option that enables charitable organizations to maximize donations by enabling access to a greater number of potential donors and intelligently suggesting donation quantities. The systems and methods described herein also reduce user actions as well as system processing requirements by enabling users to both contribute to a charitable organization and communicate with others in the process.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 3A-3B illustrate example graphical user interfaces displayed on user devices in accordance with one or more embodiments;

FIGS. 4A-4B illustrate additional example graphical user interfaces displayed on user devices in accordance with one or more embodiments;

DETAILED DESCRIPTION

Figure 1:
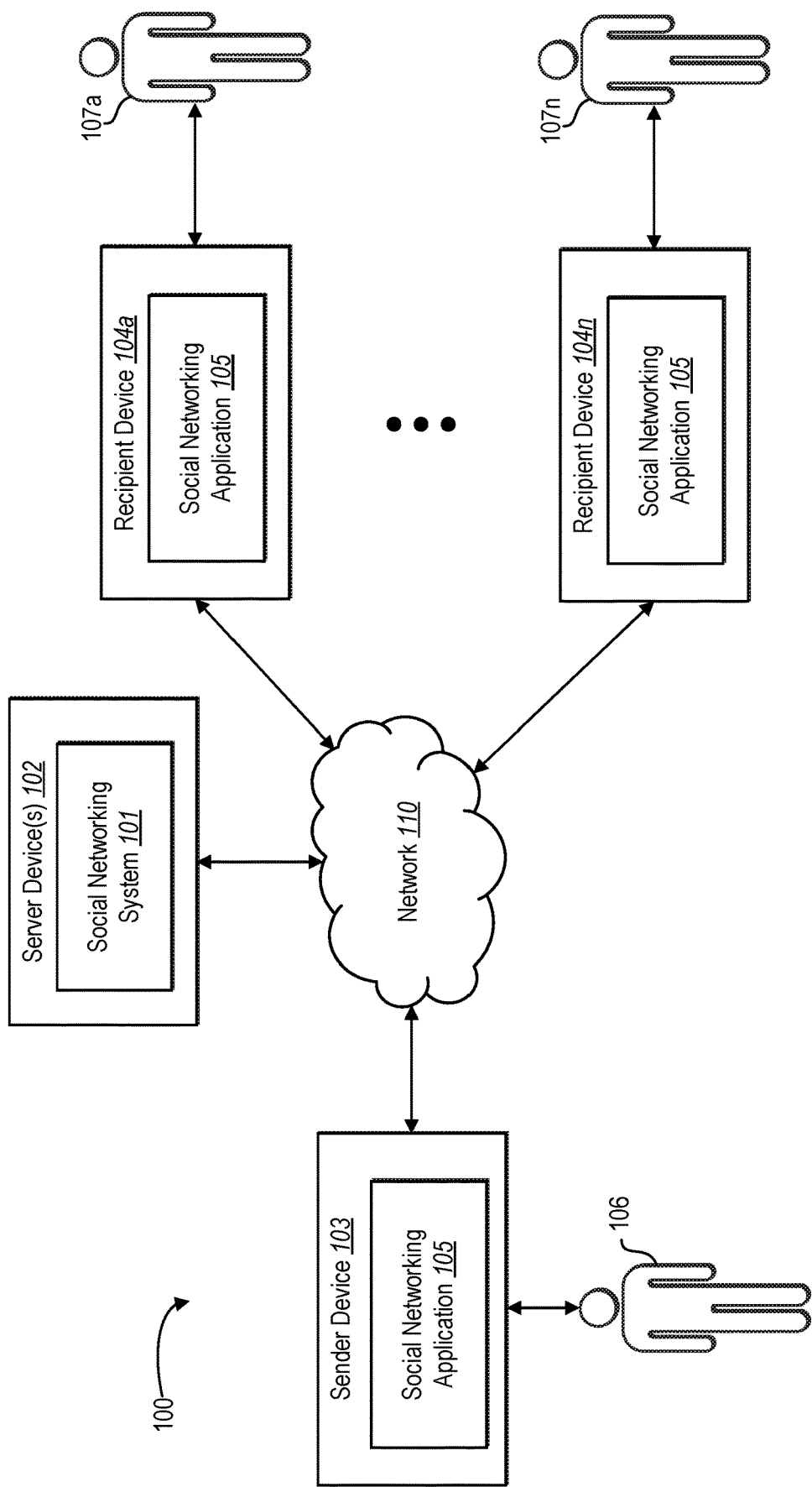
FIG. 1 illustrates a schematic diagram of an example charitable donation system in accordance with one or more embodiments.

One or more embodiments described herein provide an improved charitable donation system. In particular, one or more embodiments described herein describe a system for integrating intelligent online donation options within a social networking system. In accordance with one or more disclosed embodiments, the system disclosed herein customizes an electronic communication (e.g., post) within a social networking system to include an option to contribute to a charitable cause associated with the electronic communication. In particular, the system can provide a donation option as a user-selectable element provided in tandem with the electronic communication. In some embodiments, the system evaluates donation histories for a user and analyzes content of the electronic communication to determine distinct and customized donation quantities to provide to the user in response to a user selection of the donation option.

In accordance with a non-limiting example, the disclosed system receives, at a social networking system, an electronic communication (e.g., a message, post, comment, etc.) from a sender that is directed to one or more recipients. Upon receiving the communication, the system determines that the communication is related to a charitable cause. In some embodiments, the system analyzes the content of the communication (e.g., parses text, analyzes images or video, etc.) to determine that the communication is related to a charitable cause. For example, in these or other embodiments, the system identifies content within the communication that indicates to the recipient a desire to solicit contributions to a charitable organization. Additionally or alternatively, the system matches communication content to key terms in a database of the social networking system (e.g., by determining that a quantity of key terms are mentioned in the communication content). As another example in these embodiments, the system identifies a mentioning or tagging of the name of a charitable organization to determine that the communication is related to a charitable cause. In other embodiments, the system matches the sender or original source of the communication to a verified charitable organization registered within a database of the social networking system to determine that the communication is related to a charitable cause. For example, the system can determine that the electronic communication originates from a page administrator associated with a profile page for the charitable organization on the social networking system.

Upon receiving the communication from the sender, the system evaluates one or more donation histories associated with the sender of the communication, the one or more intended recipients, and/or the charitable organization. In some embodiments, a donation history includes a log of previous donations contributed or received by the sender, the intended recipient, and/or the charitable organization. In these or other embodiments, a donation history includes a schedule of previous donations, including date and time of each donation, amount donated, information associated with the charitable causes involved with each donation, and the sender and recipient of the electronic communication. In some embodiments, the system evaluates the donation history by analyzing previous donations made by the sender and/or the recipient, while in other embodiments the system evaluates the donation history by analyzing previous donations received by the charitable organization. Additionally, in some embodiments, the system evaluates donation histories of co-users associated with any one of the sender, the recipient, and/or the charitable organization (i.e., "friends" of the sender, the recipient, and/or the charitable organization).

To illustrate, in some embodiments, the system evaluates donation histories of the sender, the recipient, and/or the charitable organization by identifying previous contribution quantities within the donation histories that are representative of a range of quantities that the sender and/or the charitable organization most frequently receives. In the same or other embodiments, the system evaluates donation histories by identifying previous contributions indicative of the largest quantities donated to or received by charitable organizations in general (e.g., to the particular charitable organization associated with the communication from the sender), by the one or more recipients, by the sender, and/or by the particular charitable organization associated with the communication. Additionally or alternatively, the system evaluates donation histories by identifying previous contributions within the donation histories indicative of the smallest amounts donated or received by the one or more recipients, the sender, and/or the charitable organization. Additionally or alternatively still, the system evaluates donation histories by identifying donations representative of an average contribution made by the sender and/or recipient or received by the charitable organization. For example, in one embodiment, the system evaluates the donation history of a recipient of the electronic communication to identify the smallest quantity and the largest quantity that the recipient has previously donated to a charitable cause. As used herein, a donation quantity includes any one of currency, time, a number of volunteers, total man-hours, charitable gestures, goods (e.g., books, school supplies, food, etc.), medical supplies, hygiene products, etc.

The system further selects a set of donation quantities to propose to one or more recipients based on the analyzed donation histories. For example, in some embodiments, the system selects donation quantities to propose to a recipient of the communication within a certain range of quantities based on the donation history of the recipient—ideally, to propose potential quantities that the recipient would be more likely to contribute. In some embodiments, the system selects donation quantities to propose to the recipient, based on a determination of amounts likely to lead to future contributions. In other words, the system selects donation quantities to propose to the recipient in a tailored fashion, based on the donation histories of the recipient, the sender, and/or the charitable organization so as to increase the likelihood of eliciting a contribution. In some embodiments, the system identifies distinct donation quantities that are likely to lead to future donations by identifying donation quantities (e.g., contribution amounts) similar to quantities previously donated by the recipient and/or the sender, or received by the charitable organization. In the same or other embodiments, the system identifies donation quantities more likely to elicit a contribution by identifying quantities of previous donations made by "friends" of the recipient. In some embodiments, the system selects donation quantities that are the same as or similar to (e.g., within a range of) donation quantities that are more likely to elicit a contribution.

Upon selection of a set of distinct donation quantities to propose, the system customizes the communication to include an option to contribute one of the distinct donation quantities proposed in the selected set. In some embodiments, the system generates an option to contribute to include in the communication by determining a number of distinct donation quantities to display to the one or more recipients based on the selection of the set of distinct donation quantities. For example, the system customizes the communication to include an option to contribute in the form of a choice between proposed donation quantities included in the selected set (e.g., a generated option of a set of four distinct quantities to choose from). In other embodiments, the system generates an option to contribute without the necessity of choosing between options. For example, in these or other embodiments, the system generates an option to contribute in the form of an input field whereby a potential contributor is free to enter a donation quantity. In some embodiments, the system generates an option to contribute based on a performance history of each of the identified donation quantities, respectively. As used herein a performance history includes any one of a frequency of selection of a particular donation quantity, a total number of selections of a particular donation quantity, a total amount previously donated from selections of a particular donation quantity, etc. In some embodiments, the performance history also includes other information such as a date and time of each selection of a particular donation quantity, geographic information (e.g., location of contributor, location of where a given contribution was made, etc.) associated with the particular donation quantity, etc. In some embodiments, the system uses the performance history of each distinct donation quantity to predict the future performance of the particular donation quantity based on, in addition to the performance history, various factors such as: profile information of the recipient, the sender, and/or the charitable organization and geographic information of the recipient, the sender, and/or the charitable organization. In this way, the system predicts an overall future performance of a given donation quantity across all users (e.g., potential message recipients, senders, etc.) as well as a relative future performance of a particular donation quantity with respect to a particular user/message recipient. In short, the system predicts how likely each proposed donation quantity is to elicit a contribution from a given user.

After customizing the communication to include an option to contribute, the system provides the generated option to contribute for display to the recipient(s). For example, in some embodiments, the system provides the generated option for display on a client device (e.g., a mobile device, a computer, a tablet, etc.) within a user interface (UI) that includes an interactive element. In some embodiments, the system provides the generated option for display as a series of user-selectable buttons within a UI, where each button represents a distinct donation quantity, respectively. In other embodiments, the system provides the generated option to contribute for display as an input field, while in other embodiments, the system provides the generated option in the form of one or more donate buttons.

Based on a selection by the one or more recipients of the generated option to contribute, the system processes the transaction of the donation. To illustrate, in some embodiments, in response to the recipient selecting the generated option (e.g., a donate button), the system directs the recipient to a transaction processing interface. The transaction processing interface generally includes input fields whereby a user enters personal payment information and finalizes the transaction. In other embodiments, in response to the recipient selecting the generated option, the system applies (or prompts the recipient to approve the application of) a transaction account associated with the recipient within a database of the social networking system.

The systems and methods described herein provide benefits and advantages with an integrated and intelligent online donation option within a social networking system. In particular, the systems and methods described herein provide online customized donation option provided within a social networking system for greater accessibility to potential donors. Additionally, the systems and methods described herein facilitate users more easily making a contribution to a charitable cause. The systems and methods described herein also provide greater access to funds for charitable organizations by reaching out to more people. Furthermore, the systems and methods provide greater opportunity for users of the social networking system to make contributions to various charitable organizations.

By providing users with the capability to both contribute to charitable organizations and interact with co-users and others simultaneously, the systems and methods described herein require users to access fewer applications or other systems (e.g., websites, etc.). Thus, the systems and methods described herein require fewer user actions, resulting in more efficient use of user time and energy. Additionally, by providing multiple functionalities within a single application, the systems and methods described herein utilize less processing power and less memory than conventional systems and methods. That is to say, a single application that enables users to perform tasks relating to contributing to a charitable organization as well as interacting with other users uses fewer processing resources than would multiple applications each performing a single functionality of the single application.

Additional detail will now be provided with regard to the figures. For instance, FIG. 1 illustrates a schematic diagram of an example charitable donation system 100 according to one or more embodiments.

FIG. 1 is a schematic diagram illustrating an example charitable donation system 100 according to one or more embodiments. An overview of the charitable donation system 100 is described in relation to FIG. 1. Thereafter, a more detailed description of the components and processes of the charitable donation system 100 and other components within the environment are provided in relation to the remaining figures.

As illustrated by FIG. 1, the charitable donation system 100 allows users to make charitable contributions via the social networking system 101. The charitable donation system 100 can be implemented across some or all of the recipient devices 104a-104n, sender device 103, each running social networking applications 105, as well as the server device(s) 102 housing the social networking system 101. Additionally, in one or more embodiments, the charitable donation system 100 may be implemented across only the server device(s) 102 housing the social networking system 101. Also as illustrated in FIG. 1, the recipients 107a-107n and sender 106 may interact with recipient devices 104a-104n and sender device 103, respectively, in order to access content and/or services on the social networking system 101. Each of the recipient devices 104a-104n as well as sender device 103 may access the social networking system 101 via the social networking applications 105, as described above.

As described herein, the social networking system 101 can communicate with one or more of the recipient devices 104a-104n and the sender device 103 via the network 110. The network 110 may include one or more networks and may use one or communication platforms or technologies suitable for transmitting data and/or communication signals. In one or more embodiments, the network 110 may include the Internet or World Wide Web. The network 110, however, can alternatively or additionally include various other types of networks that use differing communication technologies and/or protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 1 illustrates a particular arrangement of the charitable donation system 100 including the server device(s) 102, sender device 103, and recipient devices 104a-104n, various additional or alternative arrangements are possible, as described in more detail below.

As illustrated in FIG. 1, the charitable donation system 100 allows one or more recipients (e.g., recipient 107a, 107b (not shown), . . . 107n, referenced herein collectively as recipients 107) to make an online donation to a charitable cause from within a message feed, newsfeed, and/or timeline of the social networking system 101. As further illustrated in FIG. 1, and as described in further detail below with reference to additional figures, the charitable donation system 100 allows the recipient device 104a associated with recipient 107a (as well as one or more other recipient devices, collectively referenced herein as recipient devices 104, associated with recipients 107) to communicate with server device(s) 102 via a network 110. The server device(s)

102 are also able to communicate with the recipient device 104a associated with the recipient 107a via the network 110, as well as any other recipient device(s) 104b-104n associated with a corresponding recipient 107b-107n. In addition, the charitable donation system 100 can include a sender device 103 associated with a sender 106. The sender device 103 is able to communicate with the server device(s) 102 via the network 110. Likewise, the server device(s) 102 is able to communicate with the sender device 103 via the network 110. In particular, the network 110 may facilitate communication between the sender device 103 and the server device(s) 102 to receive an electronic communication (e.g., a message, a post, a comment, etc.) at the social networking system 101. The network 110 may then, in turn, facilitate communication between the server device(s) 102 to transmit the message received at the social networking system 101 to one or more recipient device(s) 104. Alternatively, the sender device 103 and/or the recipient device(s) 104 may directly communicate with the server device(s) 102, bypassing the network 110. In another example, the server device(s) 102 may include the social networking system 101, such that the social networking system 101 receives, processes, and transmits electronic communications at the server device(s) 102.

The charitable donation system 100 coordinates the sending and receiving of electronic communications such as messages, posts, comments, etc., between the sender 106 and the recipients 107. For example, the sender 103 can send a message or other electronic communication to one or more of the recipients 107 by composing a message within a message interface of the social networking system 101. The message interface can include an interface to facilitate drafting or sharing a post, comment, message, etc. According to one or more embodiments, the charitable donation system 100 provides, by way of network 110, the message sent by the sender 106 via sender device 103 to the social networking system 101 within server device(s) 102. In the same or other embodiments, the charitable donation system 100 customizes the message or other communication to include an option to contribute to a charitable cause, whereupon the charitable donation system 100 provides the message or other communication via the network 110 to the targeted recipients 107 by way of corresponding recipient devices 104. In certain embodiments, the social networking system 101 can ensure that the sender and the recipient(s) 107 are "friends" via the social networking system 101 before they can send and receive posts, comments, and/or messages from each other. In additional or alternative embodiments, the social networking system 101 may simply ensure that the sender 106 and the recipient(s) 107 are active users of the social networking system 101.

The sender device 103 and the recipient devices 104 may include various types of computing devices. For example, the sender device 103 and the recipient devices 104 can include a mobile device such as a mobile telephone, a smartphone, a personal digital assistant, a tablet, a laptop, a smart wearable, or a non-mobile device such as a desktop, a server, and/or another type of computing device. Further, the sender device 103 and the recipient devices 104 may run dedicated social networking applications (e.g., social networking application 105) associated with social networking system 101 to access social networking content (e.g., posts, comments, messages, digital media, etc.) associated with the charitable donation system 100. As briefly mentioned above, FIG. 1 shows that sender 106 and recipient 107a can use a sender device 103 and a recipient device 104a, respectively, to engage in electronic communications with one another via the server device(s) 102 and the social networking system 101. For example, the sender 106, using sender device 103, can compose a message, comment, post, etc. to be received by the recipients 107a at recipient devices 104a. Additional details with respect to the sender device 103 and the recipient device(s) 104 are discussed below with reference to additional figures. It will be understood that each of recipient devices 104a-104n may communicate independently with sender device 103 and/or server device(s) 102, and that sender device 103 and/or server device(s) 102 may communicate independently with each of recipient devices 104a-104n such that each recipient device may receive unique communication data or other data.

Based on various embodiments of the charitable donation system 100, the server device(s) 102 store various types of information associated with senders and recipients. Specifically, the server device(s) 102 store identifier information for use in identifying the sender 106 and the recipients 107. For example, in one or more embodiments, the server device(s) 102 can include or communicate with the social networking system 101 that stores user information for users registered with the social networking system 101. As used herein a user can be a sender, a recipient, and/or a charitable organization registered with the social networking system 101 (e.g., a charitable organization having a profile or page on the social networking system 101). To illustrate, the social networking system 101 can maintain user accounts including user identification information, photos that have been uploaded, donation histories, and payment account information. The server device(s) 102 can use any of the user information to identify the sender 106, the recipients 107, to facilitate communications between the sender 106 and the recipients 107, and to initiate and process a donation transaction from the recipients 107 and/or the sender 106. In one or more embodiments, the social networking system 101 also allows third parties to process donation transactions.

As mentioned previously, and as illustrated in FIG. 1, the sender 106 and recipients 107 can interact with each other. For example, the sender 106 can be a charitable organization (e.g., an administrator for the charitable organization) that composes a message or creates a post via the social networking application 105 to explain the aims of the charitable organization to the recipients 107, according to one embodiment. In the same or other embodiments, the social networking system 101 receives the message or post from the charitable organization at the server device(s) 102 via network 110 and customizes the message or post before sending it on the recipients 107 to include an option for the recipients 107 to make a charitable contribution to the charitable organization from within the social networking application 105 by way of recipient devices 104. In additional or alternative embodiments, the sender 106 is a sender other than a charitable organization but who sends or shares a message/post relating to a charitable cause to recipients 107.

In customizing the message, post, or other electronic communication received from the sender 106 and directed to the recipients 107, the social networking system 101 determines that the communication is related to a charitable cause as will be described in further detail below with reference to FIG. 2. In particular, the charitable donation system 100 parses text included in the message or post or otherwise analyzes the content (e.g., video, images, etc.) and/or source of the communication to determine that the communication is related to a charitable cause. As mentioned, this is described in further detail below with reference to FIG. 2 as well as additional figures thereafter.

Also described in further detail below, the charitable donation system 100 evaluates donation histories of the sender 106, the recipients 107, and/or the charitable organization associated with the electronic communication. In accordance with at least one embodiment, the social networking system 101 evaluates donation histories of the sender 106 and/or the recipients 107 by analyzing past contributions made by the sender 106 and/or recipients 107 to various charitable organizations by way of the social networking application 105 within the social networking system 101. In the same or alternative embodiments, the charitable donation system 100 analyzes past contributions received by the charitable organization and/or the sender 106 (in at least one embodiment, the sender 106 can be a charitable organization) as will be described in further detail below.

The charitable donation system 100 further selects a set of distinct donation quantities (e.g., an amount of currency, a number of volunteer hours, a volume of goods, a weight of food, a number of man-hours, a count of hygiene kits, etc.) to present to the recipients 107. In certain embodiments, the charitable donation system 100 selects the set of donation quantities based on the evaluation of the donation histories of the sender 106, the recipients 107, and/or the charitable organization. In this way, the charitable donation system 100 smartly predicts donation quantities that are more likely to result in the recipients 107 making a donation to the charitable cause, as will also be described in further detail below.

Additionally, the charitable donation system 100 customizes the communication to include an option to contribute to the charitable cause (e.g., an interactive element such as a button, link, etc.). In some embodiments, the charitable donation system 100 customizes the message or other form of electronic communication (e.g., post, comment, etc.) to include selectable elements for each of the selected set of distinct donation quantities mentioned above and discussed in further detail below with reference to FIG. 2. In these or other embodiments, the recipient devices 104 display the messages in conjunction with the option to contribute so that the recipients 107 can choose (e.g., select, touch, click, press, tap, etc.) one of the donation quantities from within the set of distinct donation quantities to donate to the charitable cause by way of the social networking application 105.

The charitable donation system 100 also provides the communication to the recipients 107 through network 110 and for display on recipient devices 104. In particular, the charitable donation system 100 provides the communication along with the generated option to contribute to the charitable cause, as will be described in further detail below with reference to FIG. 2. Importantly, though FIG. 2 depicts a single recipient device 104a, it will be understood that the social networking system 101 may interact independently and individually with multiple recipient devices 104 (e.g., recipient devices 104-104n as shown in FIG. 1), according to the rules and methods outlined herein below.

Figure 2:
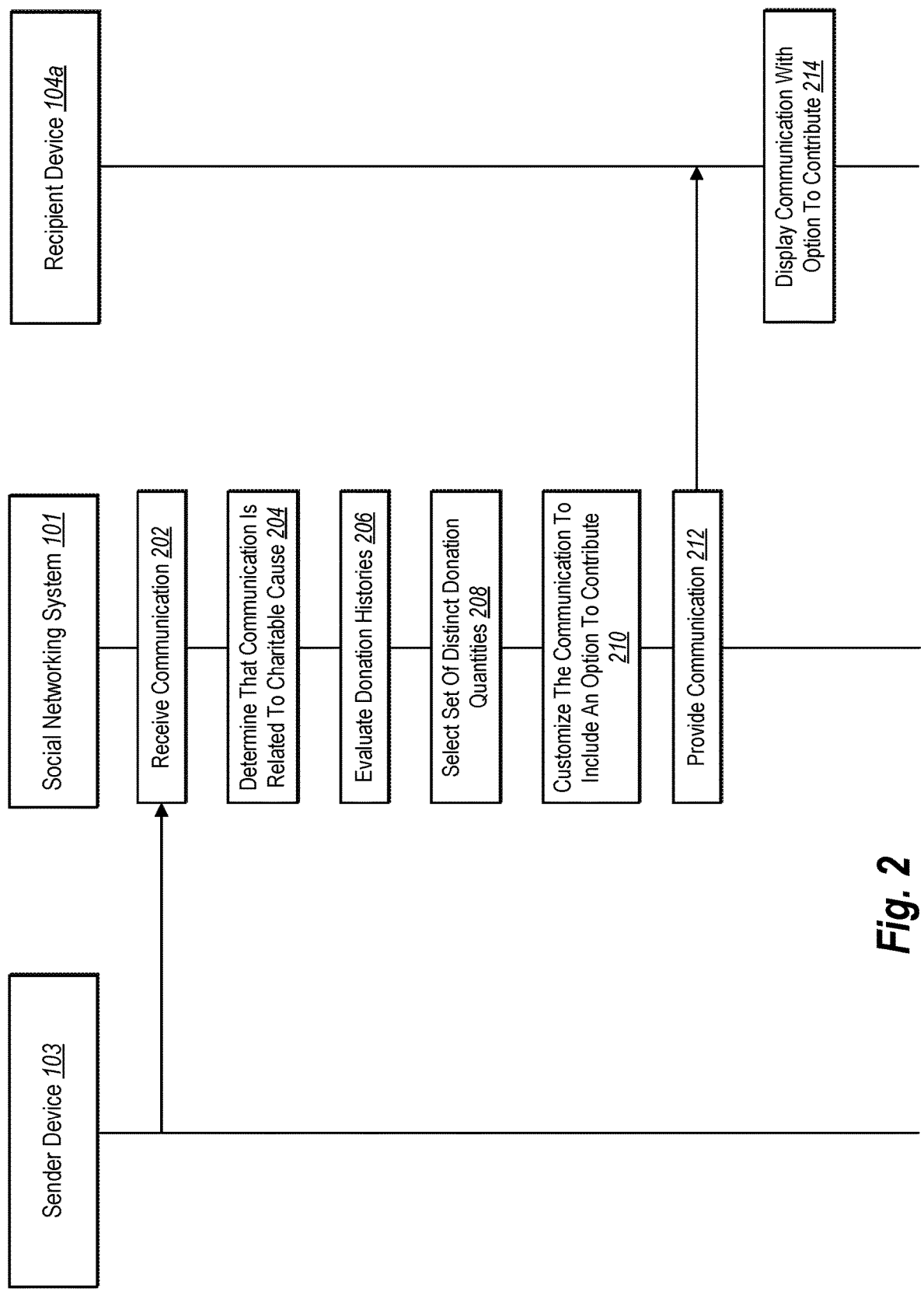
FIG. 2 illustrates a sequence flow diagram in accordance with one or more embodiments.

Looking now to FIG. 2, a process for customizing a message to include an option to contribute to a charitable cause by way of the social networking system 101 is shown. Specifically, FIG. 2 illustrates that the sender device 103 sends a message intended for receipt at the recipient device 104a. The social networking system 101 receives the communication 202 at the server device(s) 102. In some embodiments, the social networking system 101 forwards the communication on to the recipient device(s) 104a.

As illustrated in FIG. 2, the social networking system 101 determines that the communication is related to a charitable cause 204. In at least one embodiment, the social networking system 101 analyzes the communication sent by way of social networking application 105 to server device(s) 102. At the server device(s) 102, the social networking system 101 uses various techniques and methods to analyze the communication to determine whether the communication is related to a charitable cause.

To illustrate, in some embodiments, the social networking system 101 identifies the sender 106 of the communication and determines whether the sender 106 is a charitable organization or is otherwise associated with the charitable organization (e.g., an administrator for the charitable organization). In the same or other embodiments, the social networking system 101 determines whether the sender 106 is a charitable organization by checking the profile information of the sender 106 against a database maintained by the social networking system 101 at the server device(s) 102. In certain embodiments, the social networking system 101 verifies that the sender 106 is a charitable organization registered within a database of the social networking system 101. In other embodiments, the sender 106 is not a charitable organization. However, in these or other embodiments, the social networking system 101 still determines whether the communication is related to a charitable cause by verifying that at least a portion of the content within the communication refers to or is associated with a charitable organization that is registered within a database of the social networking system 101.

As mentioned, in at least one embodiment, the social networking system 101 verifies that the charitable organization (e.g., the sender 106 or the charitable organization associated with the communication content) is registered in a database maintained by the social networking system 101. Charitable organizations may register with the social networking system 101 by entering profile information and receiving approval from the social networking system 101 to collect donations by way of the social networking application 105. In accordance with privacy settings, in some embodiments, the social networking system 101 checks the user identification and/or profile information of the sender 106 and/or the charitable organization. Further, the social networking system 101 verifies that the charitable organization is an approved charitable organization by checking the user identification and/or profile information against a database of the social networking system 101.

As also mentioned, in some embodiments, the sender 106 is not a charitable organization, but is a standard user of the social networking system 101. In these or other embodiments, the sender 106 sends, shares, and/or forwards a message relating to a charitable cause associated with one or more charitable organizations. In order to determine that the communication is related to a charitable cause, the social networking system 101 analyzes the content of the communication. For example, in some embodiments, the social networking system 101 parses text of the communication to identify the name or other identifier of a charitable organization, as well as to determine that the content of the communication is directed to a charitable cause (e.g., soliciting donations for a particular charitable organization). The social networking system 101 further verifies that the charitable organization identified within the communication is registered and approved within the social networking system 101 as described above. In some embodiments, the social networking system 101 analyzes the content of the communication by matching key terms within the communication to a database of key terms maintained by the social networking system 101 at the server device(s) 102. In other embodiments, the social networking system 101 utilizes machine learning to train a model to more intelligently and adaptively analyze message text or other content to determine whether the communication is directed to a charitable cause.

As mentioned, in some embodiments, the social networking system 101 analyzes content other than text (e.g., images, videos, audio clips, etc.) to determine that the communication is related to a charitable cause. In these or other embodiments, the social networking system 101 analyzes the communication content and verifies the content against a database maintained by the social networking system 101. Thus, the social networking system 101 maintains a database of approved and/or registered videos, images, audio clips, and other media or other content that the social networking system 101 uses as a comparison check for content included in a communication, in accordance with at least one embodiment. In additional or alternative embodiments, the social networking system 101 utilizes machine learning or other methods to analyze the content of a communication to determine whether the communication is related to a charitable cause. In these or other embodiments, the social networking system 101 may define a threshold amount of content (e.g., a number of key terms or a length of video) and use that defined threshold to determine whether a communication contains enough charity-related content to be deemed as related to a charitable cause.

Also as illustrated in FIG. 2, the social networking system 101 evaluates the donation histories 206 of the sender 106, the recipient 107a associated with recipient device 104a, and/or the charitable organization associated with the charitable cause described within the communication. In particular, the social networking system 101 evaluates past donations made to the same or other charitable organizations and/or the social networking system 101 evaluates past donations received by the same or other charitable organizations.

As mentioned, the social networking system 101 evaluates the donation history 206 of the sender 106 of the communication. In accordance with one or more embodiments, the social networking system 101 evaluates past donations made by the sender 106 to the same charitable organization as is mentioned in or associated with the communication. In these or other embodiments, the social networking system 101 compiles a donation behavior model of the sender, in accordance with all relevant privacy settings. The donation behavior model includes, in some embodiments, information relating to times, dates, amounts, and other information pertaining to one or more previous donations made by the sender 106. The donation behavior model further includes information informing predictions of future donations that the sender 106 may contribute at a later time or date, depending on previous donations made by the sender 106.

As also mentioned, the social networking system 101 evaluates the donation history 206 of the recipient 107a. The social networking system 101 evaluates the donation history of the recipient 107a in much the same way as the social networking system 101 evaluates the donation history of the sender 106. In other words, the social networking system 101, in certain embodiments, evaluates past donations made by the recipient 107a to the same or other charitable organizations. Moreover, the social networking system 101 compiles a behavior model of the recipient 107a that helps the social networking system 101 predict the likelihood of future contributions from the recipient 107a based on various donation amounts, types of charitable organizations, and/or communication content. In certain embodiments, the social networking system 101 evaluates various information related to past donations made by the recipient 107a, including but not limited to time and date of each past donation, amount of each past donation, the charitable organization to which each past donation was made, the type of charitable work the recipient 107a has previously participated in (e.g., types of charitable work that the recipient 107a has sent/received messages about, types of charitable work the recipient 107a has searched, or types of charitable organizations in which the recipient 107a has otherwise shown interest). This information, including the behavior model for the recipient 107a and/or sender 106 is used, in at least one embodiment, in conjunction with profile information of the recipient 107a and/or sender 106 maintained by the social networking system 101 to predict what sorts of donations the recipient 107a might make to what sorts of charitable organizations.

Furthermore, as mentioned, the social networking system 101 evaluates the donation history 206 of the charitable organization, in accordance with one or more embodiments. The social networking system 101 evaluates the donation history of the charitable organization in the same way as described above with relation to evaluating the donation history of the sender 106 or the recipient 107a. Indeed, in certain embodiments, the sender 106 is a charitable organization.

Additionally, with reference to FIG. 2, the social networking system 101 evaluates the donation history 206 of "friends" or "followers" of (e.g., co-users associated with) the sender 106, the recipient 107a, and/or the charitable organization. The social networking system 101 evaluates the donation history 206 of the "friends" and/or "followers" of the sender 106, the recipient 107a, and/or the charitable organization in the same way as described above. In addition, in some embodiments, the social networking system 101 utilizes donation history information associated with the "friends" and/or "followers" of the sender 106, the recipient 107a, or the charitable organization to more accurately predict donation behavior of the sender 106, the recipient 107a, or the charitable organization, respectively. For example, the social networking system 101 evaluates the donation history 206 of the co-users associated with the recipient 107, in conjunction with the donation history of the recipient 107a, to gain a better understanding of charitable causes to which the recipient 107a may potentially donate. Moreover, in accordance with relevant privacy settings, the social networking system 101 analyzes the relationship between the sender 106, the recipient 107a, the charitable organization, and/or the "friends" and "followers" associated with each of them, in accordance with one or more embodiments. The social networking system 101 analyzes previous conversations, posts, comments, or other behavior within the social networking system 101 to determine a relative closeness of each relationship between the sender 106, the recipient 107a, the charitable organization, and/or the "friends" and "followers" of each. The social networking system 101 utilizes this relationship information to refine the predictions of charitable donation behavior associated with the sender 106, the recipient 107a, and/or the charitable organization. Importantly, in some embodiments, the social networking system 101 also discovers other users of the social networking application 105 who may be amenable to contributing a donation to a particular charitable organization in this way.

Referring again to FIG. 2, in some embodiments, the social networking system 101 evaluates the donation histories 206 of each of the sender 106, the recipient 107a, the charitable organization, and/or the "friends" and "followers" of each to identify optimal donation quantities that, if presented to the recipient 107a, for example, in the context of an option to contribute to a particular charitable cause, would motivate the recipient 107a to make a donation. In one or more embodiments, optimal amounts that are likely to motivate the recipient 107a to make a donation to a particular charitable cause may be similar to amounts previously donated or within a range of previous donations made to or received by the same or other charitable cause. In other embodiments, the optimal amounts that would more likely lead to the recipient 107a making a donation if displayed to the recipient 107a in the context of soliciting a donation, are within a range of previous donations made to or received by the charitable cause.

In at least one embodiment, the social networking system 101 evaluates donation histories 206 to identify amounts most frequently donated by the sender 106 and/or the recipient 107. In other embodiments, the social networking system 101 identifies amounts most frequently received by the charitable organization (e.g., the sender 106, in embodiments where the sender 106 is a charitable organization). In the same or other embodiments, the social networking system 101 evaluates the donation histories 206 to identify average amounts received and/or donated, largest amounts received and/or donated, and smallest amounts received and/or donated to the charitable organization.

As further illustrated in FIG. 2, the social networking system 101 selects a set of distinct donation quantities 208 based on the evaluation of the donation histories 206. In particular, the social networking system 101 utilizes the information gathered from evaluating the donation histories 206, including behavior models, predictions, past donation information (e.g., amount, time, date, location, associated charitable organization, etc.) to select a set of distinct donation quantities 208 to provide, along with the received 202 communication, to the recipient 107a by way of recipient device 104. As described below and depicted in FIGS. 3A-3B, FIG. 4A-4B, and FIGS. 5A-5B, the set of distinct donation quantities may be presented to the recipient 107a by way of the recipient device(s) 104 in the form of interactive elements (e.g., buttons, links, etc.) that each represent one quantity from within the set of distinct donation quantities. In some embodiments, the social networking system 101 selects the set of distinct donation quantities 208 such that the set of distinct donation quantities is within a range or threshold of quantities that the recipient 107a is likely to select to donate to a charitable cause (e.g., the charitable cause who sent the communication). For example, if the evaluation of the donation history 206 of recipient 107a indicates that recipient 107a is most likely to donate money in the range of $1 to $15 to wildlife preservation organizations, then the social networking system 101 selects a set of donation quantities 208 to correspond with that indication.

As used herein, a donation quantity includes any type of quantifiable donation that could be contributed or pledged by way of an online platform. For example, a donation quantity may be an amount of currency, a duration of time, a number of man-hours, a count of volunteers, a number of units (e.g., hygiene kits), a volume of goods, a count of boxes of medical supplies, etc.

Returning to FIG. 2, in some embodiments, the social networking system 101 uses machine learning techniques to train a model to select a set of donation quantities 208. In certain embodiments, the social networking system 101 uses a machine learning model to identify those quantities that would probabilistically maximize the amount that the recipient 107a would donate to a particular charitable cause. In other embodiments, the social networking system 101 uses a machine learning model to identify those donation quantities to include within the set of donation quantities that would maximize a probability that the recipient 107a would make a donation. For example, in one embodiment, the machine learning model may establish that recipient 107a has a history of donating larger amounts (e.g., in the range of $500) to wildlife preservation organizations. In this example embodiment, the social networking system 101 may then select a set of donation quantities 208 relating to a wildlife preservation organization, where the donation quantities within the set are within a range including $500. In this way, the social networking system 101 attempts to maximize a donation probability or a donation amount, or both.

In still further embodiments, the social networking system 101 selects a set of donation quantities 208 such that the donation quantities are more likely to motivate the recipient 107a to make a future donation. In other words, the social networking system 101 selects donation quantities to include in the set that is to be provided to the recipient 107a so that the recipient 107a is more amenable to the idea of donating to the charitable cause. To illustrate, some recipients (e.g., recipient 107a) may be turned off to the idea of making an online contribution to a charitable cause if the solicited amounts displayed within the set of donation quantities were too large for the recipient's budget. Thus, it is important that the social networking system 101 selects a set of distinct donation quantities 208 tailored to the recipient 107a.

The social networking system 101 selects a set of distinct donation quantities 208 in any number of ways or formats. For example, in some embodiments, the social networking system 101 selects a set consisting of four distinct donation quantities, each within a small range (e.g., $5) of each other. In other embodiments, the social networking system 101 selects a set of donation quantities that includes more or fewer distinct donation quantities. In the same or alternative embodiments, the social networking system 101 selects a set of donation quantities that have a wider or narrower range, or else that do not have any particular correlation or pattern.

In some embodiments, the sender 106 sends a communication to more than one recipient (e.g., recipient 107a and recipient 107b (not shown)). As described in further detail below with reference to FIGS. 3A-3B and FIGS. 4A-4B, the social networking system 101 selects, in addition to the first set of distinct donation quantities intended to be included with the message for one recipient (e.g., recipient 107a), a second set of distinct donation quantities to include with the message intended for a different recipient (e.g., recipient 107b), according to at least one embodiment. In some embodiments, the social networking system 101 selects the set of distinct donation quantities 208 for each recipient 107 (e.g., recipient 107a and recipient 107b) independently such that each recipient 107a-107n receives a different and personally tailored set of distinct donation quantities. In this way, the social networking system 101 ensures that each recipient (e.g., recipient 107a) sees donation quantities that are more likely to elicit a donation from that respective recipient (e.g., recipient 107a).

Additionally, as illustrated in FIG. 2, the social networking system 101 customizes the communication to include an option to contribute 210 to the charitable cause. In particular, the social networking system 101 includes an option to contribute (e.g., a user-selectable button, link, icon, or other element) as displayed in further detail below with reference to FIGS. 3A-3B, FIGS. 4A-4B, and FIGS. 5A-5B. For example, in some embodiments, the social networking system 101 customizes the communication to include an option to contribute 210 with the communication before sending the communication to the recipient 107*a*. In other embodiments, the social networking system customizes the communication to include an option to contribute 210 by sending a system-generated automatic message (e.g., a message that is generated by the social networking system 101 at the server device(s) 102) in tandem with the communication from the sender 106. In these or other embodiments, the system-generated automatic message is sponsored by the charitable organization to which it pertains (e.g., the charitable organization to whom the donations would go should the recipient 107*a* opt to contribute).

Figure 5B:
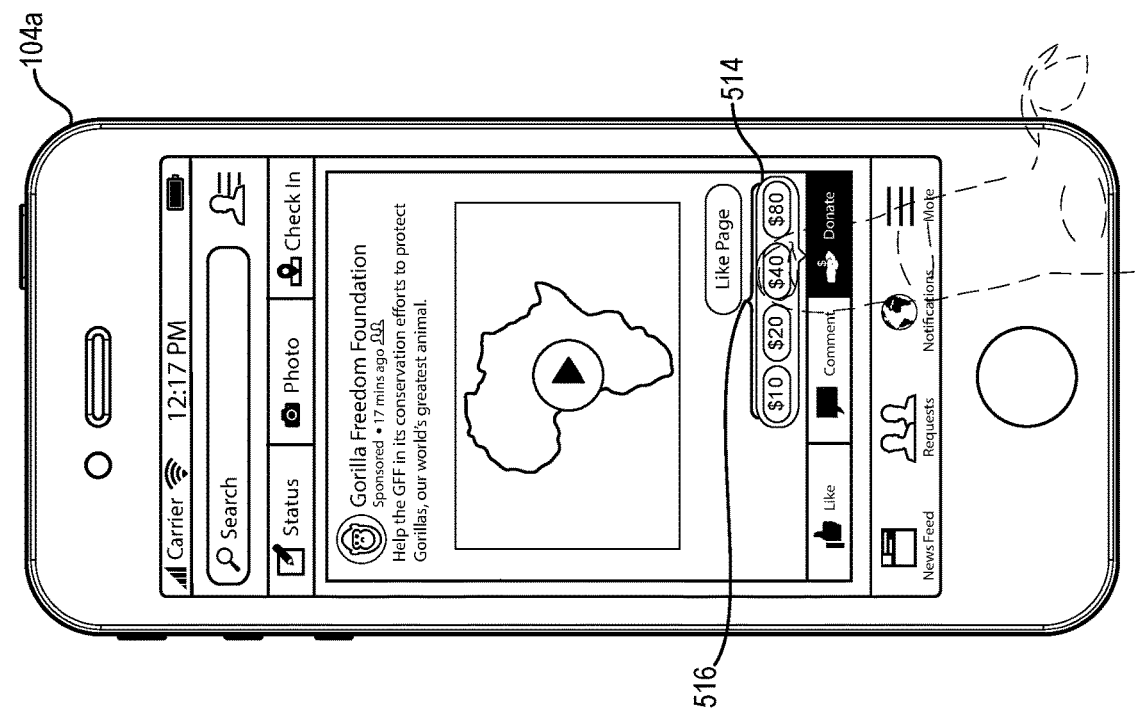
FIGS. 5A-5B illustrate further example graphical user interfaces displayed on user devices in accordance with one or more embodiments.
Figure 5A:
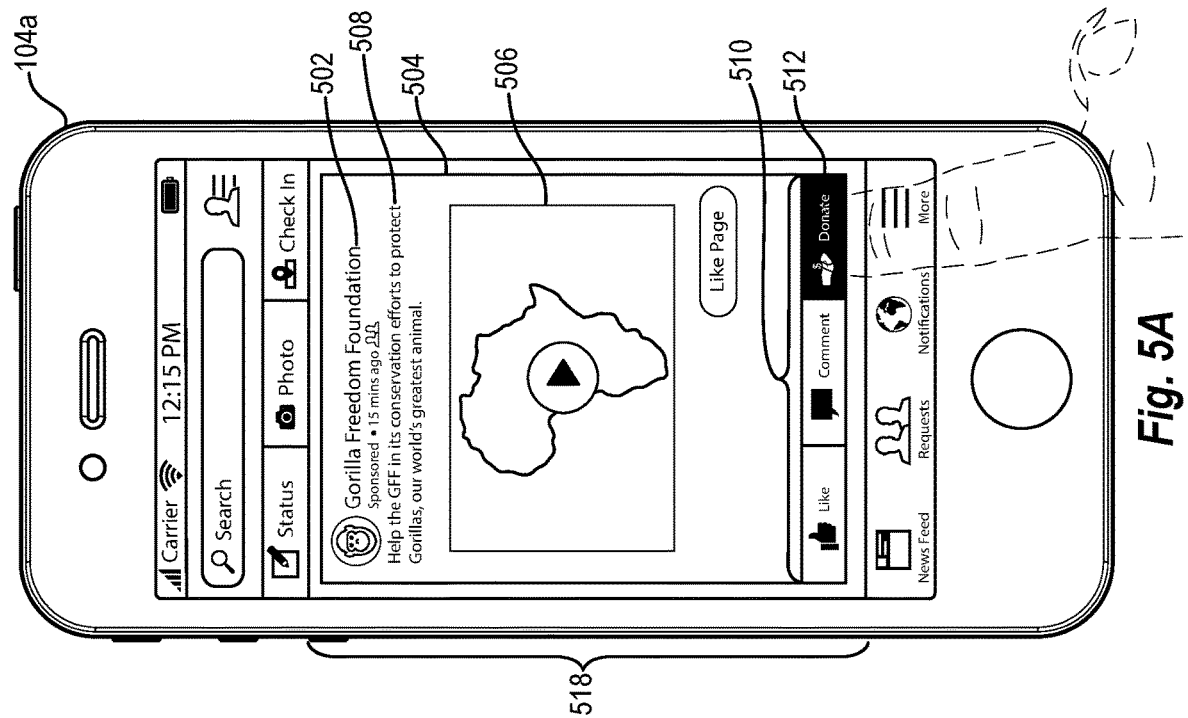

In certain embodiments, the social networking system 101 customizes the message, post, or other communication as shown and described in further detail below with reference to FIGS. 3A-3B, FIGS. 4A-4B, and FIGS. 5A-5B. For example, in at least one such embodiment, the social networking system 101 customizes the communication to include the option to contribute to the charitable cause within the message itself as shown in FIGS. 3A and 3B. In additional or alternative embodiments, the social networking system 101 customizes the communication to include a separate, automatically generated (e.g., generated by the social networking system 101 or the charitable organization associated with the charitable cause described within the communication) communication with the option to contribute to the charitable cause, as illustrated in FIGS. 4A and 4B. In still other embodiments, the social networking system 101 customizes the communication to include the option to contribute by including a donate option within an option ribbon (e.g., the option ribbon that includes other options such as an option to react to a post, comment on a post, and/or share the post, etc.) associated with a post on a newsfeed of the social networking system 101, as illustrated by FIGS. 5A and 5B.

As mentioned above, the social networking system 101 customizes the communication to include an option to contribute 210 for each of recipients 107. As shown below in FIGS. 3A-3B and FIGS. 4A-4B, the social networking system 101 may display different variations of the option to contribute to different recipients (e.g., recipient 107*a* and recipient 107*b*). These variations may be based on donation histories of each individual recipient, the donation history of the sender 106, the donation history of the charitable organization, the behavior models compiled by the social networking system 101, and various other factors.

As shown in FIG. 2, in some embodiments, the social networking system 101 provides the customized communication 212 (e.g., the communication with the included option to contribute to the charitable cause) for display on the recipient device 104*a*. The recipient device 104*a* displays the communication with the option to contribute 214 to the recipient 107*a*, as will be described in further detail below with reference to FIGS. 3A-3B, FIGS. 4A-4B, and FIGS. 5A-5B.

In some embodiments, the social networking system 101 receives a selection (e.g., a touch input, gesture, mouse input, keyboard input, voice input, etc.) by the recipient 107*a* of one of the set of distinct donation quantities included in the option to contribute to the charitable cause. In these or other embodiments, the social networking system 101 directs the recipient 107*a* through the donation transaction. In certain embodiments, the social networking system provides, for display on recipient device 104*a*, a transaction processing interface. The transaction processing interface enables the recipient 107*a* to enter payment and/or personal information to complete the transaction. In some embodiments, the social networking system 101 completes the transaction by handling processing of personal payment information and completing the transaction, whereas in other embodiments the social networking system 101 merely collects personal payment information from the recipient 107*a* and utilizes a third party payment processor to process and complete the transaction. In still other embodiments, the social networking system 101 prompts the recipient 107*a* (e.g., via a pop-message) to use a personal payment account associated with the recipient 107*a* and maintained by the social networking system 101 at the server device(s) 102. The personal payment account includes stored personal information, account information, payment information, and any other information necessary to complete the donation transaction. In yet further embodiments, the social networking system 101 redirects the user to a separate donation form, application, or web page associated with the charitable cause to complete the donation.

As will be described in more detail below, the components of the charitable donation system 100 as described with regard to FIG. 1 can provide, along and/or in combination with other components, one or more graphical user interfaces ("GUIs"). In particular, the components can allow a user to interact with a collection of display elements for a variety of purposes. Specifically, FIGS. 3A-3B, 4A-4B, and 5A-5B and the corresponding portions of the description illustrate various example embodiments of the GUIs and features that are in accordance with general principles as described herein.

Looking now to FIGS. 3A and 3B, example embodiments are illustrated with respect to recipient devices 104*a* and 104*b*, associated with recipient 107*a* and 107*b*, respectively. FIG. 3A shows recipient device 104*a* with a display 302 portraying a message interface within the social networking application 105 or a separate messaging application. In particular, in some embodiments, the recipient device 104*a* or 104*b* is a mobile device (e.g., a smartphone), while in other embodiments the recipient device 104*a* or 104*b* is a desktop computer, tablet, or any other computing device capable of executing functions relating to electronic communications, including but not limited to the social networking application 105. In some embodiments, the message interface includes a message feed 312 comprising a series of back-and-forth communications between multiple users (e.g., sender 106 and recipients 107*a* and 107*b*) of the social networking system 101. In other embodiments, the message feed 312 is an electronic mail interface, instant messaging interface, text message interface, or any other interface suitable for electronic messaging between one or more users.

In particular, FIG. 3A illustrates a message feed 312 including various messages between various users (e.g., sender 106, recipient 107*a* associated with recipient device 104*a*, recipient 107*b*, and others). Within the message feed 312, sender 106 has sent message 304 to recipient 107*a* associated with recipient device 104*a* and recipient 107*b* associated with recipient device 104*b*. Moreover, sender 106 has sent a video 306 to recipients 107*a* and 107*b* as well. As illustrated in FIGS. 3A and 3B, the charitable donation system 100 and/or the social networking system 101 analyzes the content of the message 304 and/or the content of the video 306 to determine that the message 304 and/or the video 306 is related to a charitable cause. In addition, the charitable donation system 100 verifies that the charitable cause (e.g., the GFF) is recognized and registered in a database of approved charitable causes.

As shown in FIGS. 3A and 3B, the charitable donation system 100 includes the options to donate 308a and 308b with the video 306 within the message feed 312. In these or other embodiments, the charitable donation system 100 first receives the video 306 from the sender 106 and analyzes the content of the video 306 to determine that the video 306 is related to a charitable cause before customizing the video 306 to include the option to contribute 308a or 308b to then provide the video 306 and the option to contribute 308a or 308b to the recipient 107a or 107b. In certain embodiments, the charitable donation system 100 analyzes the content of the video 306 to determine whether the video 306 is related to a charitable cause. In some embodiments, the charitable donation system 100 checks the video 306 against a database of the social networking system 101 to determine whether the video 306 originated with a charitable organization. In other embodiments, the charitable donation system 100 checks the profile information of the sender 106 to determine whether the sender 106 is a charitable organization or whether the sender 106 is associated with a charitable organization. In still other embodiments, the charitable donation system 100 performs a heuristic analysis of the video 306 to determine whether the video 306 is related to a charitable cause. Even though FIGS. 3A and 3B illustrate a video 306 from sender 106, it will be recognized that any media or other message attachment or other content may be included in a message relating to a charitable cause. In some embodiments, the charitable donation system 100 analyzes all content included in a message to determine whether the message is related to a charitable cause.

In some embodiments, after the charitable donation system 100 has received the message 304 and/or video 306 and determined that the message 304 and/or video 306 is related to a charitable cause, the charitable donation system 100 asks the sender 106 whether he or she would like to include an option to contribute (e.g., option 308a or 308b) with the message 304 and/or video 306. In accordance with privacy settings, the charitable donation system 100 provides a message prompt to the sender 106 by which the sender 106 indicates whether he or she would like to include an option to contribute 308a or 308b with the message 304 and/or the video 306. In other embodiments, the charitable contribution system 100 automatically includes the option to contribute 308a or 308b without interaction from the sender 106, in accordance with the relevant privacy settings and/or preferences set by the sender 106.

Importantly, while FIGS. 3A and 3B illustrate electronic communications taking place within a message feed 312 representative of FACEBOOK MESSENGER®, it will be appreciated that the charitable donation system 100 may be implemented within any suitable electronic communication interface, such as a text messaging interface, an email interface, an instant messaging interface, etc.

FIG. 3A further illustrates an option to contribute 308a. In some embodiments, the charitable donation system 100 includes the option to contribute 308a with the message 304 or the video 306 upon determining that the message 304 and/or the video (or other content) is related to a verified charitable cause that is registered with the charitable donation system 100. As depicted in FIG. 3A, the charitable donation system 100 generates the option to contribute 308a according to the donation history of the recipient 107a associated with recipient device 104a, as described in further detail above. As shown, the generated option to contribute 308a includes a set of distinct donation quantities 310a representative of quantities that recipient 107a is likely to contribute to the charitable cause associated with the message 304 and/or the video 306 (e.g., the GFF). The charitable donation system 100 customizes the message 304 and/or video 306 to include an option to contribute 308a that is tailored to recipient 107a, based on profile information, donation history, etc., and in accordance with privacy settings.

FIG. 3B illustrates the same message feed 312 on recipient device 104b associated with recipient 107b. As depicted in FIG. 3A, recipient 107b has participated in the conversation. FIG. 3B shows the message 304 from sender 106 as well as the video 306, also from sender 106. As illustrated in FIG. 3B, the option to contribute 308b is different from the option to contribute 308a associated with recipient 107a. The charitable donation system 100 generates the option to contribute 308b in accordance with the evaluation of the donation history of recipient 107b as well as compiled behavior models and profile information as described in further detail above with relation to FIG. 2. In other words, the charitable donation system 100 customizes the message 304 and/or the video 306 to include an option to contribute 308b to a charitable cause (e.g., the GFF) that is tailored to recipient 107b such that the option to contribute 308b includes a set of distinct donation quantities 310b that is more likely to elicit a contribution from recipient 107b.

Importantly, FIG. 3B contrasts with FIG. 3A in that FIG. 3B illustrates the same message feed 312 taking place on recipient device 104b for display to recipient 107b. In some embodiments, the charitable donation system 100 receives the message 304 and/or video 306 that is intended for multiple recipients (e.g., recipient 107a and recipient 107b). In these embodiments, the charitable donation system 100 evaluates the donation history of each recipient 107a and 107b to select a set of one more distinct donation quantities (e.g., set 310a and set 310b) to provide to each recipient 107a and 107b, respectively. Whereas the charitable donation system 100 customized the video 306 to include an option to contribute 308a with a set of donation quantities 310a ranging from $1 to $20 for recipient 107a, the charitable donation system 100 customized the video 306 to include a different option to contribute 308b, including an entirely different set of donation quantities 310b, for recipient 107b. The different quantities within the sets of donation quantities (e.g., set 310a and 310b) are a result of the charitable donation system 100 evaluating the donation histories of recipient 107a and 107b, respectively, to compile behavior models and determine what sorts of values or amounts each recipient would be likely to contribute to the GFF, and/or that would maximize contributions and contribution amounts to the GFF.

In some embodiments, the charitable donation system 100 customizes the message 304 and/or video 306 to include an option to contribute 308a or 308b in the form of a series of selectable buttons (e.g., the set of distinct donation quantities 310a or 310b). In other embodiments, however, the charitable donation system 100 configures the option to contribute 308a or 308b to have a different appearance and/or functionality. Particularly, in some embodiments, the charitable donation system 100 generates an option to contribute 308a or 308b and configures the option to contribute 308a or 308b to include the set of distinct donation quantities 310a or 310b. In these or other embodiments, the set of distinct donation quantities 310a or 310b may include each one or more quantities displayed to the recipient 107a or 107b. The charitable donation system 100 may integrate the set of donation quantities 310a or 310 into the option to contribute 308a or 308b. In other embodiments, the option to contribute 308a or 308b includes a donate button or any other interactive element (e.g., a link, text box, icon, etc.) displayed to the recipient 107a or 107b such that the charitable donation system 100 enables the recipient 107a or 107b to make an online contribution to the charitable cause.

FIGS. 3A and 3B illustrate one example embodiment of an option to contribute (e.g., option 308a or 308b) to a charitable cause by way of the social networking system 101. As described in further detail below, FIGS. 4A and 4B illustrate another example embodiment of an option to contribute (e.g., option 404a or 404b). As shown in FIGS. 4A and 4B, recipient 107a and recipient 107b are participating in a conversation within message feed 412, similar to the conversation depicted in FIGS. 3A and 3B within message feed 312. However, in FIGS. 4A and 4B, the charitable donation system 100 customizes the message 402 to include an option to contribute (e.g., option 404a or 404b) that is different than in FIGS. 3A and 3B, as will be described in more detail hereafter.

Looking now to FIGS. 4A and 4B, the sender 106 sends a message 402 intended for recipient 107a and recipient 107b associated with recipient devices 104a and 104b, respectively. FIGS. 4A and 4B depict a message feed 412 similar to message feed 312 depicted in FIGS. 3A and 3B. However, as shown in FIGS. 4A and 4B, the charitable donation system 100 customizes a message (e.g., message 402) from a sender (e.g., sender 106) to include an option to contribute (e.g., option 404a or 404b) to a charitable cause (e.g., the GFF) in the form of a sponsored message, in accordance with one or more embodiments. In particular, the charitable donation system 100 generates the sponsored option to contribute 404a or 404b in response to determining that the communication (e.g., message 402) is related to a charitable cause and prompts the sender 106 to decide whether or not to send the sponsored option to contribute 404a or 404b in conjunction with the message 402.

FIG. 4A illustrates the message feed 412 displayed on recipient device 104a. In particular, as shown in FIG. 4A, the charitable donation system 100 receives the message 402 intended for recipient 107a and, in response to evaluating the donation history of the sender 106, the recipient 107a, and/or the charitable organization (e.g., the GFF), the charitable donation system 100 customizes the message 402 to include an option to contribute 404a, as displayed in recipient device 104a. As described in detail above with reference to FIG. 2, the charitable donation system 100 customizes the message 402 to include an option to contribute 404a that is tailored to the recipient 107a, based on an evaluation of the donation history of the recipient 107a, among other factors. In particular, in some embodiments, the option to contribute 404a includes a set of distinct donation quantities 406a ranging from $1 to $20.

Importantly, FIG. 4A depicts a sponsored option to contribute 404a that includes the set of donation quantities 406a. In certain embodiments, the charitable donation system provides the message 402 from the sender 106 to the recipient 107a and, in addition, provides a sponsored option to contribute 404a. The sponsored option to contribute 404a may be included with (e.g., integrated within, attached to, etc.) the message 402 or may be sent as a separate message as shown in FIG. 4A. In some embodiments, the charitable donation system 100 seeks the approval of the charitable organization associated with the message 402 before determining whether to include the option to contribute 404a.

As mentioned, FIG. 4B illustrates the same message feed 412 on recipient device 104b associated with recipient 107b. Recipient 107b is a participant within the conversation discussed above with regard to FIG. 4A. As shown in FIG. 4B, the charitable donation system 100 provides, with the message 402, a sponsored option to contribute 404b that includes a different set of distinct donation quantities 406b than the set 404a shown in FIG. 4A. As discussed above, the charitable donation system 100 tailors the option to contribute 406b to the recipient 406b based on the evaluation of the donation histories of the recipient 107b, the sender 106, and/or the charitable organization associated with the message 402.

While FIGS. 3A-3B and FIGS. 4A-4B depict differences shown in the message feed (e.g., message feed 312 and message feed 412) for different users (e.g., recipient 107a and recipient 107b) participating in the same online conversation, FIGS. 5A-5B are a sequence of displays illustrating an animation effect of recipient 107a selecting the option to contribute 512, according to one or more embodiments.

FIG. 5A illustrates recipient device 104a displaying a post 504 within a timeline or newsfeed 518. As shown in FIG. 5A, device 104a is associated with recipient 107a. The sender 502 is the hypothetical charitable organization, Gorilla Freedom Foundation. In particular, the post 504 posted by the sender 502 includes a message portion 508 and a video 506. Additionally, the charitable donation system 100 provides, to the recipient 107a, an option banner 510 that includes one or more user-selectable options therein. For example, the option banner 510 includes a "Like" option, a "Comment" option, and a "Donate" option (i.e., the option to contribute 512).

As shown in FIG. 5B, the charitable donation system 100 provides the post 504 to the recipient 107a within the newsfeed 518. As described above, the charitable donation system 100 customizes the post 504 to include an option to contribute 512 based on the evaluation of donation histories, behavior models, profile information, geographic information, etc. In particular, the charitable donation system 100 determines that the post 504 is related to a charitable cause in a variety of ways, as previously described. Particularly, in some embodiments the charitable donation system 100 verifies the identity of the sender 502 as a charitable organization that is registered within a database of the social networking system 101. In other embodiments, the charitable donation system 100 analyzes the content of the post 504 by parsing text of the message portion 508. In still other embodiments, the charitable donation system 100 analyzes the content of the post 504 to determine that the post 504 is related to a charitable cause by verifying the video 506 (or other media) as a video that belongs to or originates from a charitable organization (e.g., the Gorilla Freedom Foundation).

Upon determining that the post 504 is related to a charitable cause, the charitable donation system 100 selects a set of distinct donation quantities to include in the option to contribute 512 to provide along with the post 504 to the recipient 107a. In some embodiments, the charitable donation system 100 includes the option to contribute 512 within an option banner 510 of the post 504. The option to contribute 512 may be a button or other interactive element configured to, upon selection (e.g., clicking, pressing, touching, hovering over, etc.) by the recipient 107a, indicate to the charitable donation system 100 to further display the set of distinct donation quantities 516 within a pop-up banner 514 as shown in FIG. 5B.

FIG. 5B illustrates the same recipient device 104a as shown in FIG. 5A after the recipient 107a has selected (e.g., touches) the "Donate" option 512 from the option banner

510. Upon detecting the selection of the "Donate" option 512, the charitable donation system 100 provides, for display to the recipient 107*a*, a pop-up banner 514 from which the recipient 107*a* chooses a donation amount. The pop-up banner 514 includes a set of distinct donation quantities 516 customized for recipient 107*a* as described in detail above. In some embodiments, the charitable donation system 100 animates the transition of displaying the pop-up banner 514 and/or animates the individual selectable donation amounts within the pop-up banner 514 to move, vibrate, or otherwise attract the attention of the recipient 107*a*. The recipient 107*a* and then slide their finger from the "Donate" option 512 up to one of the desired donation amounts within the pop-up banner 514 to select the desired amount to donate.

While FIGS. 3A, 3B, 4A, 4B, 5A and 5B illustrate recipient devices (e.g., recipient devices 104*a* and 104*b*), running a social networking application (e.g., social networking application 105) in communication with a social networking system 101, it will be appreciated that the charitable donation system 100 described above and further described below may also be performed within any communication system such as an electronic messaging system in communication with one or more electronic messaging applications.

Figure 6:
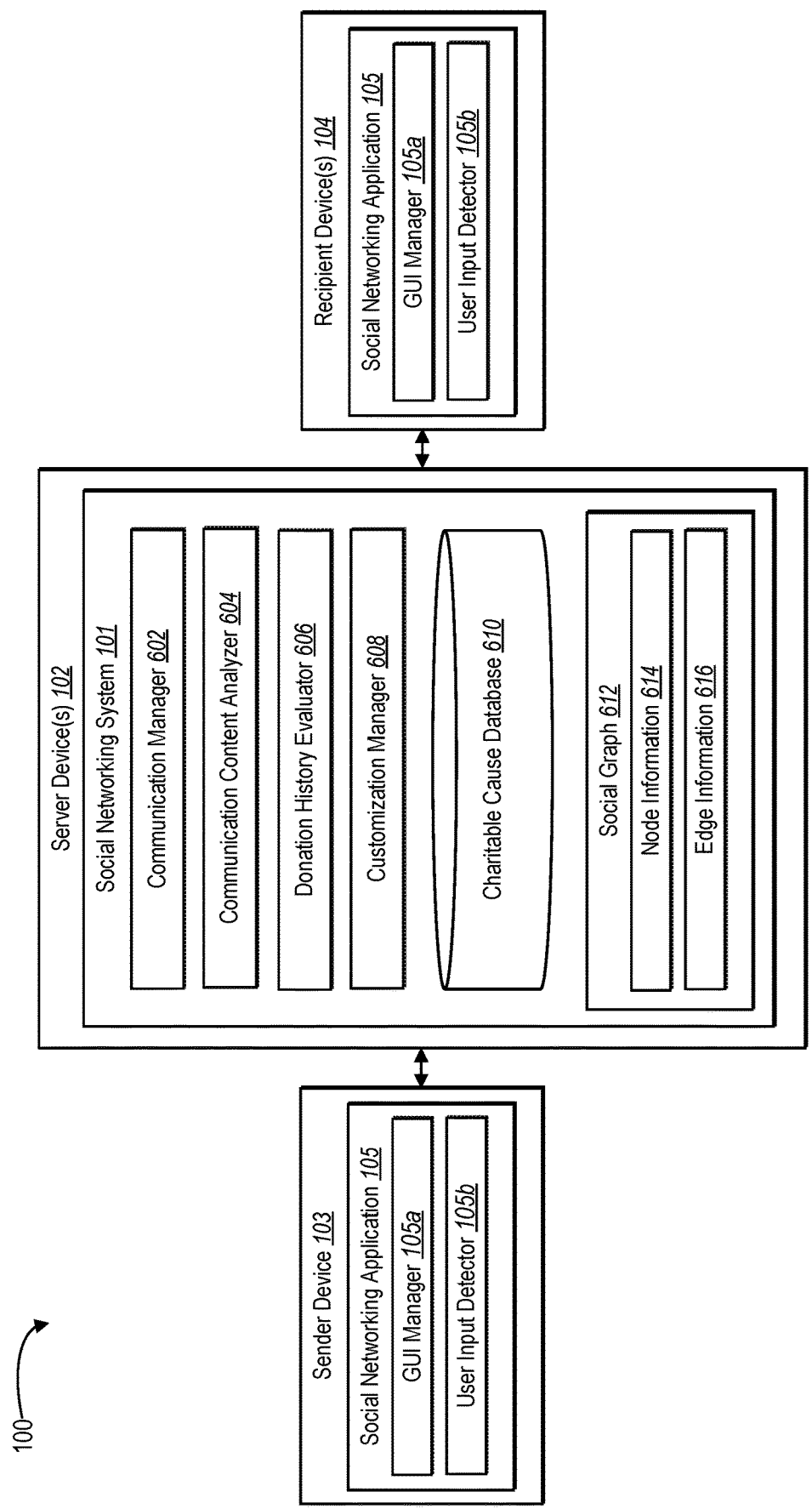
FIG. 6 illustrates a detailed schematic diagram of a charitable donation system in accordance with one or more embodiments.

FIG. 6 shows a schematic diagram illustrating details of the example environment of the charitable donation system 100 shown in FIG. 1, including the components of the charitable donation system 100. As shown in FIG. 6, the charitable donation system 100 includes a sender device 103, recipient device(s) 104, and server device(s) 102. In general, the charitable donation system 100 allows a sender 106 associated with the sender device 103 to engage in communications with one or more recipient(s) 107 associated with recipient device(s) 140 by way of the server device(s) 102. Additionally, the charitable donation system 100 allows one or more recipient(s) 107 to make charitable contributions to a charitable cause by way of the social networking system 101 on the server device(s) 102.

As shown, the charitable donation system 100 includes various components within the sender device 103. In particular, the charitable donation system 100 includes, on the sender device 103, the social networking application 105, which includes a GUI manager 105*a* and a user input detector 105*b*.

As also shown, the charitable donation system 100 includes various components on the recipient device(s) 104. The charitable donation system 100 includes the same or essentially the same components on the recipient device(s) 104 as on the sender device 103. In particular, the charitable donation system 100 includes the social networking application 105, which includes a GUI manager 105*a* and a user input detector 105*b*

As further illustrated in FIG. 6, the charitable donation system 100 includes various components on the server device(s) 102. In particular, the charitable donation system 100 includes, on the server device(s) 102, a social networking system 101, which includes a communication manager 602, a communication content analyzer 604, a donation history evaluator 606, a customization manager 608, a charitable cause database 610, and a social graph 612. The social graph 612 further includes node information 614 and edge information 616. The components of the sender device 103, the recipient device(s) 104, and the server device(s) 102 work together to provide to the recipient 107 an option to contribute to a charitable cause from within an electronic communication conversation. Importantly, FIG. 6 illustrates an example configuration of components for the sender device 103, the recipient device(s) 104, and the server device(s) 102. In other embodiments, more or fewer components may be utilized by the charitable contribution system 100 to provide charitable online donation functionality within a social networking system 101, such as a single facility or module. Each of the components of the sender device 103, the recipient device(s) 104, and the server device(s) can communicate with each other or with components of each other using any suitable communication technologies.

While FIG. 6 describes certain components as part of the social networking application 105 and other components as part of the social networking system 101, the present disclosure is not so limited. In alternative embodiments, one or more of the components as shown in FIG. 6 as part of the social networking application 105 can be part of the social networking system 101 or vice versa. Similarly, one or more components shown as part of the social networking application 101 can be part of the social networking application 105 or vice versa. The components can include software, hardware, or both. For example, the components can include computer instructions stored on a non-transitory computer-readable storage medium and executable by at least one processor of the sender device 103, the recipient device(s) 104, and/or the server device(s) 102 to perform the methods and processes described herein. Alternatively, the components can include hardware, such as a special purpose processing device to perform certain a certain function or group of functions. Additionally or alternatively, the components can include a combination of computer-executable instructions and hardware.

In one or more embodiments, the social networking application 105 on both the sender device 103 and the recipient device(s) 104 is a native application installed on the sender device 103 and the recipient device(s) 104. For example, the social networking application 105 on one or both devices 103 and 104 may be a mobile application that installs and runs on a mobile device, such as a smart phone or tablet. Alternatively, the social networking application 105 may be a desktop application, widget, or other form of a native computer program that runs on a desktop device application, widget, or other form of a native computer program that runs on a desktop device or laptop device. Alternatively, the social networking application 105 may be a remote application, such as a web application executed within a web browser that is accessible to the sender device 103 and recipient device(s) 104.

The social networking application 105 on both the sender device 103 and the recipient device(s) 104 includes a GUI manager 105*a* and a user input detector 105*b*. The social networking application 105 allows a user (e.g., sender 106 and/or recipient 107) to send and receive electronic communication. In particular, the GUI manager 105*a* of the social networking system 105 enables the sender device 103 and/or the recipient device(s) 104 to display messages, posts, etc., within a variety of user interfaces of the social networking application 105, as discussed above with relation to FIGS. 3A-3B, FIGS. 4A-4B, and FIGS. 5A-5B. The GUI manager 105*a* also provides, manages, and/or controls a user interface that allows a sender to send electronic communications and a recipient to receive electronic communications. For example, the GUI manager 105*a* can provide a user interface that facilitates the composition of instant messages, social networking posts, or other content.

More specifically, the GUI manager 105*a* facilitates the display of a user interface (e.g., by way of a display device associated with the corresponding user device 103 or recipient device(s) 104). For example, the user interface may be composed of a plurality of graphical components, objects, and/or elements that allow a user to compose, send, and receive messages and/or charitable contributions. More particularly, the user interface manager 105*a* may direct the corresponding device to display a group of graphical components, objects, and/or elements that enable a user to view a messaging thread, newsfeed, or timeline.

As further illustrated in FIG. 6, the social networking application 105 includes a user input detector 105*b*. In one or more embodiments, the user input detector 105*b* can detect, receive, and/or facilitate user input in any suitable manner. In some examples, the user input detector 105*b* can detect one or more user interactions with respect to the user interface. As referred to herein, a "user interaction" means a single interaction or a combination of interactions, received from a user by way of one or more input devices. For example, user input detector 105*b* can detect a user interaction from a keyboard, mouse, touch pad, touchscreen, and/or any other input device. In the event the sender device 103 or the recipient device(s) 104 include a touchscreen, the user input detector can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface. In the same or other examples, the user input detector 105*b* of the social networking application 105 enables the sender device 103 and/or the recipient device(s) 104 to detect and respond to input (e.g., a touch, a swipe, a scroll, a drag, a click, a press, etc.) from the sender 106 and the recipient 107, respectively. As described above, the charitable donation system 100 responds to detected user input in a variety of ways, including enabling a recipient 107 to make an online contribution to a charitable cause.

The social networking application 105 can perform one or more functions in response to the user input detector 105*b* detecting user input and/or receiving other data. Generally, a user can control, navigate within, and otherwise use the social networking application 105 by providing one or more user inputs that the user input detector 105*b* can detect. For example, in response to the user input detector 105*b* detecting user input, one or more components of the social networking application 105 allow a user to select elements in a user interface and/or generate messages by inputting text or other content. In addition, in response to the user input detector 105*b* detecting user input, one or more components of the social networking application 105 allow a user to navigate through one or more user interfaces to review received messages, contacts, donation history, etc.

As mentioned above, in addition to the sender device 103 and the recipient device(s) 104, the charitable donation system 100 can further include a social networking system 101 that is implemented in whole or in part on the server device(s) 102. In one or more embodiments of the present disclosure, the social networking system 101 is part of FACEBOOK®, while in other embodiments the social networking system 101 may comprise another type of application, including but not limited to an email application, search engine application, online donation application, messaging application, or any number of other applications that utilize user accounts.

In one or more embodiments, the social networking system 101 may include a social graph 612 for representing and analyzing a plurality of users and concepts. Node storage of the social graph can store node information 614 comprising nodes for users, nodes for concepts, nodes for transactions (e.g., donations), and nodes for items. Edge storage of the social graph can store edge information 616 comprising relationships between nodes and/or actions occurring within the social networking system 101. Further detail regarding the social networking system 101, social graphs, edges, and nodes is presented below with respect to FIG. 10.

As illustrated in FIG. 6, the communication manager 602 processes messages received from sender device 103. For example, the communication manager 602 can interact with the sender device 103. The communication manager 602 can act as a director for messages or data received from a sender device 103 and sent to a recipient device(s) 104. The communication manager 602 may also receive a donation request from a charitable organization and/or the sender device 103. In addition, the communication manager 602 may also receive a donation submission from the recipient device(s) 104. The communication manager 602 further allows senders and recipients to exchange messages via the social networking application 105. Additionally, the communication manager 602 can send a message for a recipient to multiple recipient device(s) 104.

As further illustrated in FIG. 6, the communication content analyzer 604 can analyze content included in a message or other communication received by the communication manager 602. The communication content analyzer 604 may check the sender identification and/or profile information to verity that the sender is a charitable organization. In particular, the communication content analyzer 604 may interact with the charitable cause database 610 to verify that the sender and/or charitable organization are registered within the charitable cause database 610. Furthermore, the communication content analyzer 604 may interact with the charitable cause database 610 to verify that specific message text (e.g., keywords) or content (e.g., a charity-made or charity-sponsored video or image) is stored in the charitable cause database 610 and therefore approved by the social networking system 101. Alternatively, the communication content analyzer 604 may parse text or otherwise perform heuristic analysis of the received communication to determine that the communication is related to a charitable cause.

The social networking system 101 may also include a donation history evaluator 606. The donation history evaluator 606 may check previous donations associated with the sender device 103 and/or the recipient device(s) 104. Additionally or alternatively, the donation history evaluator 606 may evaluate previous donations associated with user profiles of the sender, the recipient, and/or the charitable organization. The donation history evaluator 606 may collect data associated with previous donations such as donation amounts, frequency of donation, patterns of donation, times of donations, dates of donations, charities associated with each donation, geographic location of associated charities, geographic location of the recipient at the time of donation, etc. The donation history evaluator 606 may establish a behavior model comprising compiled data to predict potential future behavior of the sender and/or the recipient.

As shown in FIG. 6, the social networking system 101 may also include a customization manager 608. The customization manager 608 may interact with the communication content analyzer 604 and/or the communication manager 602 to use the donation histories of the sender, the recipient, and the charitable cause to customize the communication intended for the recipient. In particular, the customization manager 608 may modify the communication received from the sender device 103 to include an option to contribute to the charitable cause associated with the communication, in any of the ways previously described.

As also shown in FIG. 6 and mentioned above, the charitable cause database 610 stores information or content related to charitable organizations that have registered with and been approved by the social networking system 101. For example, the charitable cause database 610 may store information related to specific text or other content (e.g., videos, images, etc.) that are registered with the social networking system 101 as being related to a charitable cause. Moreover, the charitable cause database 610 may contain a store of approved charitable organizations to which users of the social networking system 101 may donate.

FIGS. 1-6 illustrate an example environment and various implementations of the charitable donation system 100, including its parts and components. Moving now to FIG. 7, an example method and its description will be provided. The example method 700 illustrated in FIG. 7 includes a number of acts to perform the example method 700. It will be understood that the method 700 is an example embodiment, and that other methods may be performed by the charitable donation system 100 that include more or fewer steps.

Figure 7:
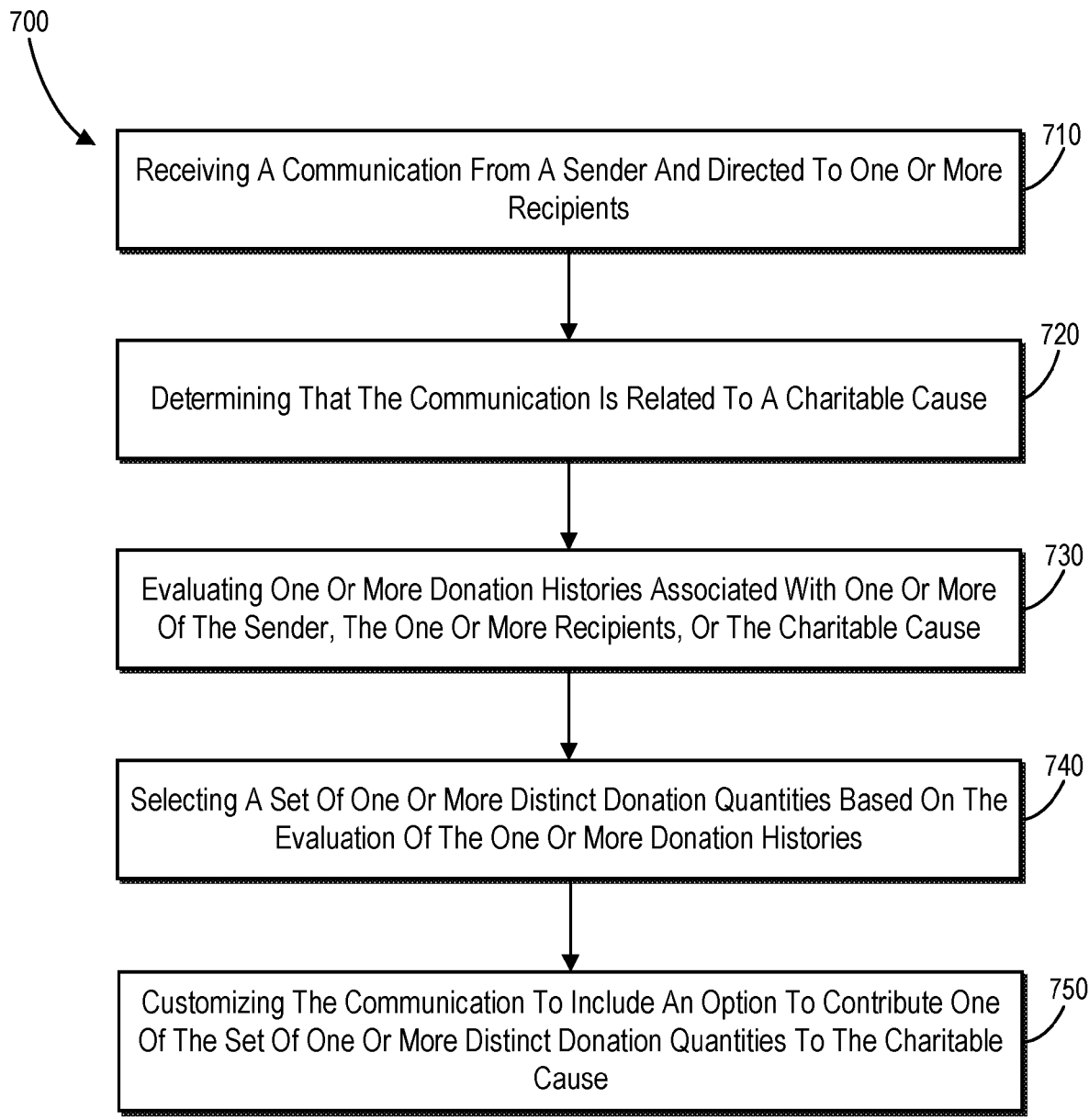
FIG. 7 illustrates a flowchart of a series of acts in a method of customizing an option to contribute to a charitable cause in accordance with one or more embodiments.

FIG. 7 illustrates a flowchart of a method 700 of customizing a communication to include an option to contribute to a charitable cause. The method 700 includes an act 710 of receiving a communication from a sender and directed to one or more recipients. For example, the act 710 involves receiving, from a sender (e.g., sender 106) associated with sender device 103, a communication that is directed to one or more recipients (e.g., recipient 107) associated with the recipient device(s) 104. Additionally, the communication can include content related to a charitable cause. Act 710 can involve receiving multiple communications directed to one or more recipients, in accordance with alternative embodiments.

The method 700 also includes an act 720 of determining that the communication is related to a charitable cause. To illustrate, act 720 can involve comparing key terms in the communication to key terms in a database (e.g., database 610) maintained by the social networking system 101. The act 720 may involve determining whether a quantity of matching communication content is sufficient to satisfy a threshold. Act 720 can also involve heuristically analyzing content such as videos or images to determine that the content is related to a charitable cause, as discussed above. Furthermore, act 720 can also involve parsing text. In additional or alternative embodiments, the act 720 can involve verifying that the sender of the communication is a charitable organization registered with the social networking system 101 to determine that the communication is indeed related to a charitable cause.

The method 700 further includes an act 730 of evaluating one or more donation histories associated with one or more of the sender, the one or more recipients, or the charitable cause. Act 730 can involve evaluating past donations by the sender, the recipient, and/or the charitable organization. In particular, act 730 can involve analyzing each individual prior donation made to charitable organizations to collect data associated with each donation, as described in more detail above. Act 730 can also include evaluating the history of the charitable donation receiving donations from users of the social networking system 101. As part of act 730, the method 700 can include identifying users of the social networking system 101 that have made previous donations to a particular charitable organization and determining a relationship between previous donors and the recipient (e.g., recipient 107) associated with recipient device 104. The act 730 may involve identifying contribution amounts that are most likely to lead to a contribution by the at least one recipient. In some embodiments, identifying contribution amounts that are most likely to lead to a contribution by the at least one recipient involves identifying a set of amounts selected from the group consisting of: amounts most frequently donated by the one or more recipients or the sender; amounts most frequently received by the sender or the charitable cause; average amounts donated by the one or more recipients or the sender; average amounts received by the sender or the charitable cause; the largest amounts donated by the one or more recipients or the sender; the largest amounts received by the sender or the charitable cause; the smallest amounts donated by the one or more recipients or the sender; and the smallest amounts received by the sender or the charitable cause.

Additionally, the method 700 includes an act 740 of selecting a set of one or more distinct donation quantities based on the evaluation of the one or more donation histories. In particular, act 740 can involve selecting one or more quantities of money, durations of time, numbers of volunteers, etc., to later include in an option to contribute provided with the communication to the recipient. The set of distinct donation quantities can include one or more individual quantities, each representative of an amount to present to the recipient as a potential donation amount. The act 740 can involve determining, based on the evaluation of donation histories (act 730), selecting a set of distinct donation quantities that will most likely elicit a contribution from the recipient of the communication. In some embodiments, the set of donation quantities may resemble quantities that the recipient has previously donated. In other embodiments, the set of donation quantities may be within a range of average quantities that the particular charitable organization associated with the communication typically receives. In still other embodiments, the set of donation quantities may be customized for each recipient of the communication where the communication is intended for more than one recipient, such that each set of donation quantities is different from the others. The act 740 may involve training, based on machine learning, a model to identify the set of donation quantities that will maximize one or more of a donation probability or a donation amount.

As further illustrated in FIG. 7, the method 700 includes an act 750 of customizing the communication to include an option to contribute one of the set of one or more distinct donation quantities to the charitable cause. In particular, the act 750 may involve attaching the option to contribute to the communication. Alternatively, the act 750 may involve sending a separate sponsored message that includes the option to contribute, as depicted in FIGS. 4A-4B. Alternatively still, the act 750 may involve altering the communication as shown in FIGS. 3A-3B to include the communication content in addition to the option to contribute as part of the communication. In some embodiments, the act 750 may involve customizing a post on a newsfeed or timeline to include the option to contribute within an option banner as discussed above in relation to FIGS. 5A-5B. In other embodiments, the act 750 may involve customizing the communication in any other way so as to provide both the communication as well as the option to contribute to the charitable cause to the recipient. Additionally, in some embodiments the option to contribute includes one or more interactive elements selectable to initiate a transaction.

In one or more embodiments, the method 700 further includes an act of providing, for display, the communication and the option to contribute to the at least one recipient by way of a post, a comment, or a message within the social networking system (e.g., social networking system 101). The method 700 may further include an act of evaluating one or more donation histories associated with one or more of a plurality of co-users associated with the one or more recipients. Furthermore, the method 700 may include an act of processing a transaction of the selected distinct donation quantity by: directing, based on the selected on the one or more distinct donation quantities, the at least one recipient to a transaction processing interface, or by applying, based on an approval of the at least one recipient, a transaction account associated with the at least one recipient to process the transaction of the selected distinct donation quantity.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
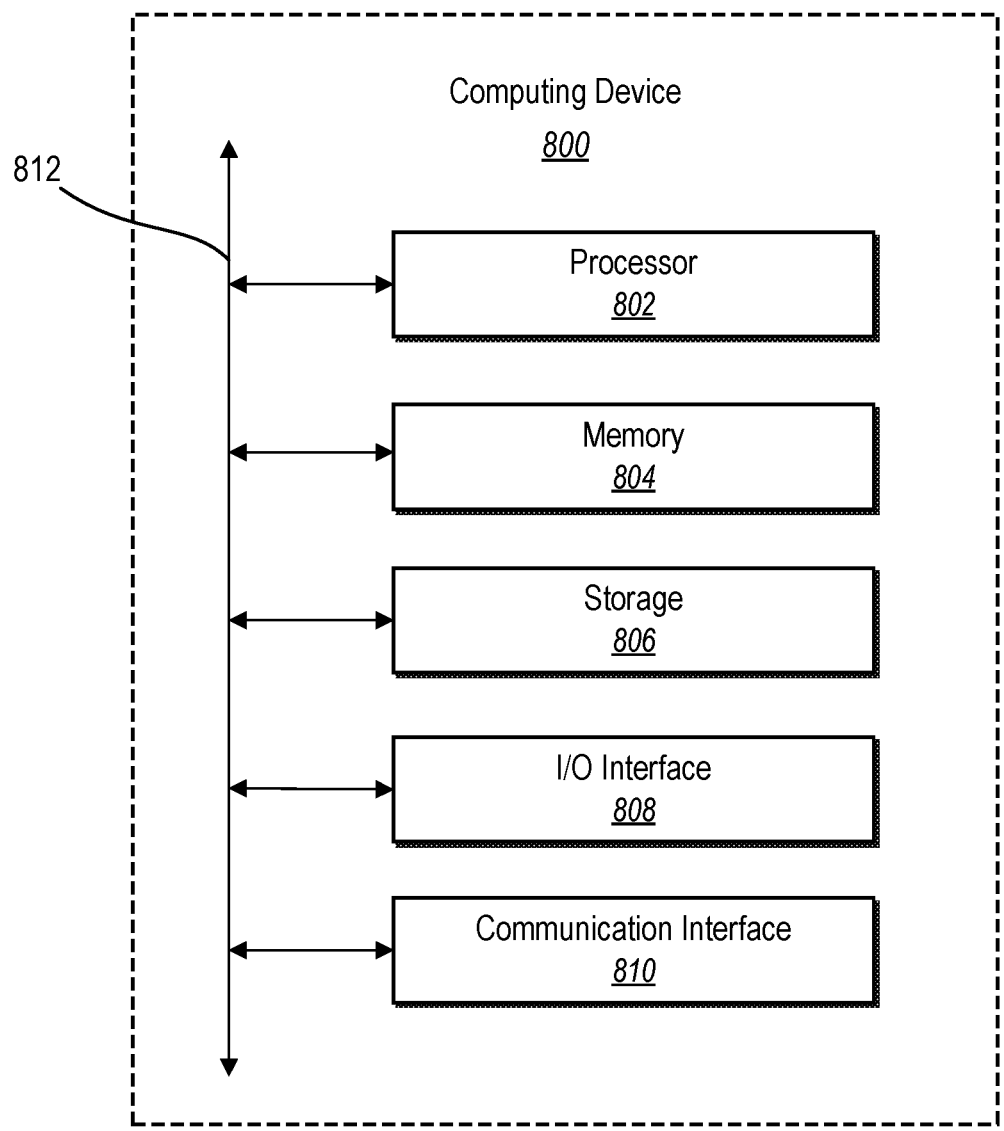
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the charitable donation system 100. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA)

bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the charitable donation system 100 can comprise a social-networking system. A social-networking system may enable its users (such as persons or organizations) to interact with the system and with each other. As mentioned above, the charitable donation system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 9:
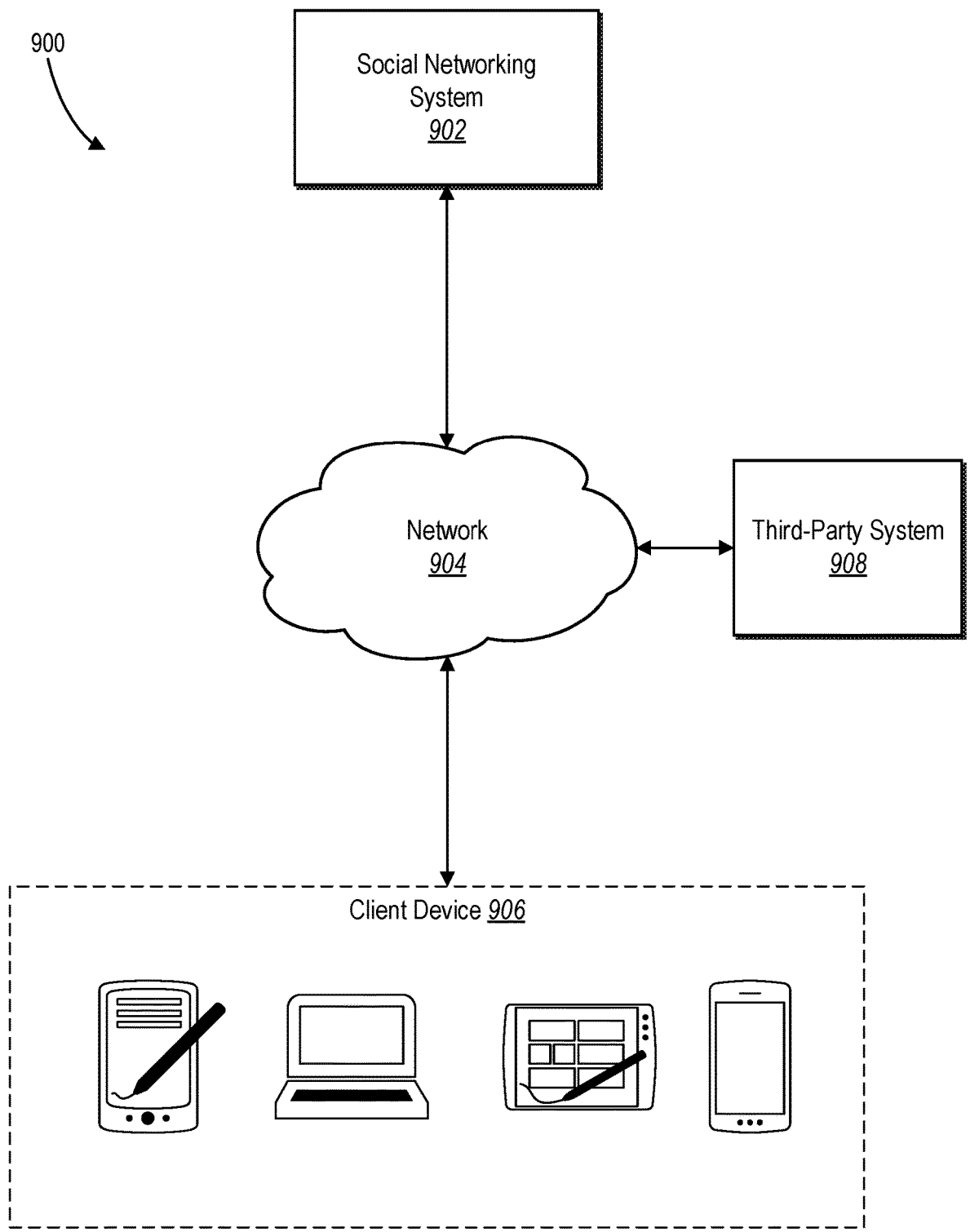
FIG. 9 illustrates an example network environment of a charitable donation system in accordance with one or more embodiments.

FIG. 9 illustrates an example network environment 900 of a social-networking system. Network environment 900 includes a client system 906, a social-networking system 902, and a third-party system 908 connected to each other by a network 904. Although FIG. 9 illustrates a particular arrangement of client system 906, social-networking system 902, third-party system 908, and network 904, this disclosure contemplates any suitable arrangement of client system 906, social-networking system 902, third-party system 908, and network 904. As an example and not by way of limitation, two or more of client system 906, social-networking system 902, and third-party system 908 may be connected to each other directly, bypassing network 904. As another example, two or more of client system 906, social-networking system 902, and third-party system 908 may be physically or logically co-located with each other in whole or in part. Moreover, although FIG. 9 illustrates a particular number of client systems 906, social-networking systems 902, third-party systems 908, and networks 904, this disclosure contemplates any suitable number of client systems 906, social-networking systems 902, third-party systems 908, and networks 904. As an example and not by way of limitation, network environment 900 may include multiple client system 906, social-networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social-networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include any of the computing devices discussed above in relation to FIG. 9. A client system 906 may enable a network user at client system 906 to access network 904. A client system 906 may enable its user to communicate with other users at other client systems 906.

In particular embodiments, client system 906 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 902 may be a network-addressable computing system that can host an online social network. Social-networking system 902 may generate, store, receive, and send social-networking data, such as, for example, user-profile data, concept-profile data, social-graph information, or other suitable data related to the online social network. Social-networking system 902 may be accessed by the other components of network environment 900 either directly or via network 904. In particular embodiments, social-networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social-networking system 902, or a third-party system 908 to manage, retrieve, modify, add, or delete, the information stored in data store.

In particular embodiments, social-networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 902 may provide users of the online social network the ability to communicate and interact with other users. In particular embodiments, users may join the online social network via social-networking system 902 and then add connections (e.g., relationships) to a number of other users of social-networking system 902 whom they want to be connected to. Herein, the term "friend" may refer to any other user of social-networking system 902 with whom a user has formed a connection, association, or relationship via social-networking system 902.

In particular embodiments, social-networking system 902 may provide users with the ability to take actions on various types of items or objects, supported by social-networking system 902. As an example and not by way of limitation, the items and objects may include groups or social networks to which users of social-networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 902 or by an external system of third-party system 908, which is separate from social-networking system 902 and coupled to social-networking system 902 via a network 904.

In particular embodiments, social-networking system 902 may be capable of linking a variety of entities. As an example and not by way of limitation, social-networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social-networking system 902. In particular embodiments, however, social-networking system 902 and third-party systems 908 may operate in conjunction with each other to provide social-networking services to users of social-networking system 902 or third-party systems 908. In this sense, social-networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 902 also includes user-generated content objects, which may enhance a user's interactions with social-networking system 902. User-generated content may include anything a user can add, upload, send, or "post" to social-networking system 902. As an example and not by way of limitation, a user communicates posts to social-networking system 902 from a client system 906. Posts may include data such as status updates or other textual data, location information, photos, videos, links, music or other similar data or media. Content may also be added to social-networking system 902 by a third-party through a "communication channel," such as a newsfeed or stream.

In particular embodiments, social-networking system 902 may include a variety of servers, sub-systems, programs, modules, logs, and data stores. In particular embodiments, social-networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 902 may also include suitable components such as network interfaces, security mechanisms, load balancers, failover servers, management-and-network-operations consoles, other suitable components, or any suitable combination thereof. In particular embodiments, social-networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 902 to one or more client systems 906 or one or more third-party system 908 via network 904. The web server may include a mail server or other messaging functionality for receiving and routing messages between social-networking system 902 and one or more client systems 906. An API-request server may allow a third-party system 908 to access information from social-networking system 902 by calling one or more APIs. An action logger may be used to receive communications from a web server about a user's actions on or off social-networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social-networking system 902. A privacy setting of a user determines how particular information associated with a user can be shared. The authorization server may allow users to opt in to or opt out of having their actions logged by social-networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
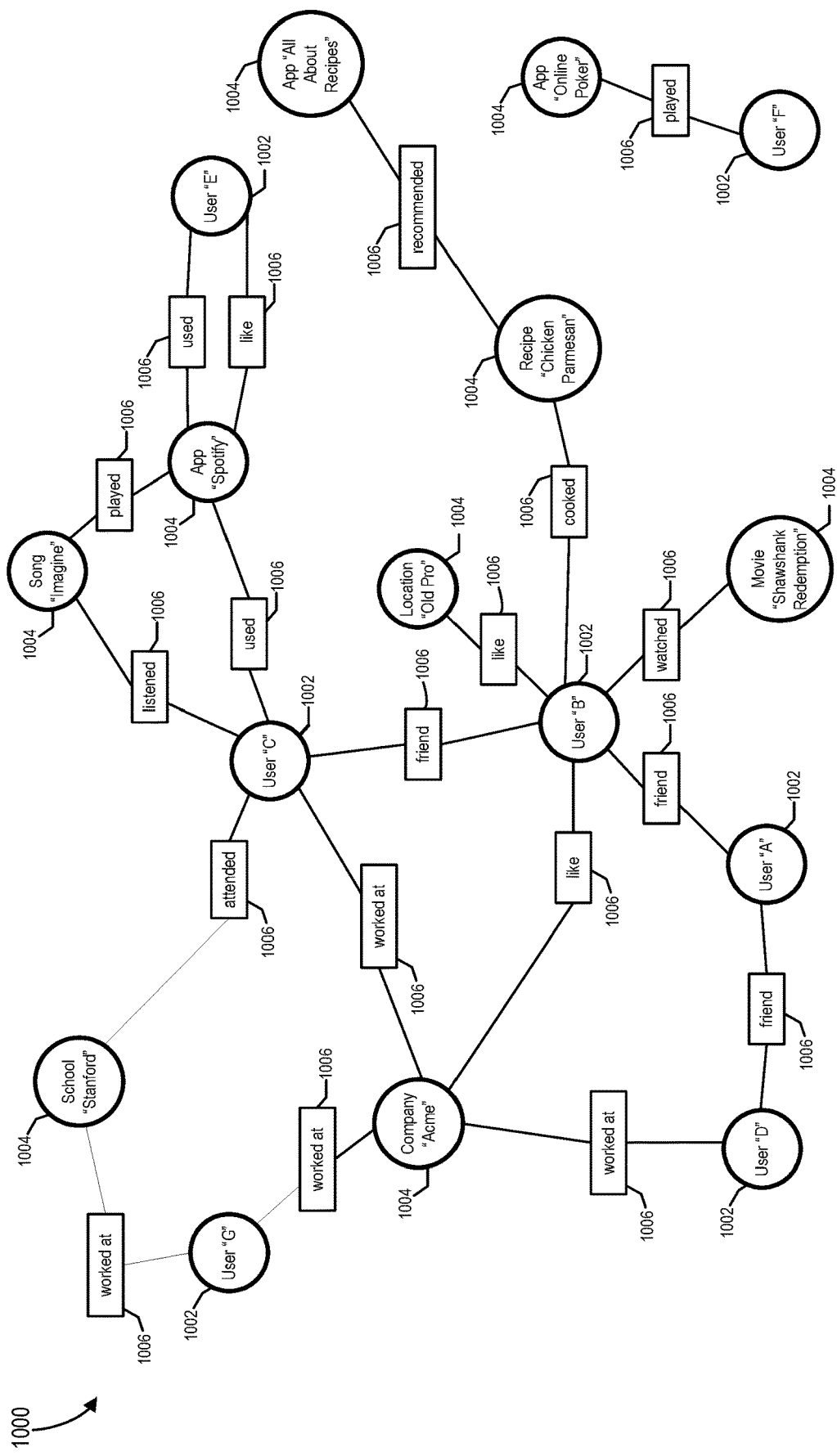
FIG. 10 illustrates a social graph in accordance with one or more embodiments.

FIG. 10 illustrates example social graph 1000. In particular embodiments, social-networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social-networking system 902. As an example and not by way of limitation, a user may be an individual (human user), an entity (e.g., an enterprise, business, or third-party application), or a group (e.g., of individuals or entities) that interacts or communicates with or over social-networking system 902. In particular embodiments, when a user registers for an account with social-networking system 902, social-networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 902. In particular embodiments, a user node 1002 may be associated with information provided by a user or information gathered by various systems, including social-networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social-networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social-networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social-networking system 902 a message indicating the user's action. In response to the message, social-networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 902 may send a "friend request" to the second user. If the second user confirms the "friend request," social-networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social-networking system 902 a message indicating the user's liking of the concept associated with the concept-profile page. In response to the message, social-networking system 902 may create an edge 1006 between user node 1002 associated with the user and concept node 1004, as illustrated by "like" edge 1006 between the user and concept node 1004. In particular embodiments, social-networking system 902 may store an edge 1006 in one or more data stores. In particular embodiments, an edge 1006 may be automatically formed by social-networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 902) or RSVP (e.g., through social-networking system 902) to an event associated with the advertisement. In addition or as an alternative, an advertisement may include social-networking-system context directed to the user. As an example and not by way of limitation, an advertisement may display information about a friend of the user within social-networking system 902 who has taken an action associated with the subject matter of the advertisement.

In particular embodiments, social-networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 902 may calculate a coefficient based on a user's actions. Social-networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social-networking system 902 may analyze a user's actions to determine whether one or more of the actions indicate an affinity for subject matter, content, other users, and so forth. As an example and not by way of limitation, if a user may make frequently posts content related to "coffee" or variants thereof, social-networking system 902 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 902 may calculate a coefficient based on the type of relationship between particular objects. Referencing the social graph 1000, social-networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 902 may determine that the user has a higher coefficient with respect to the first photo than the second photo because having a tagged-in-type relationship with content may be assigned a higher weight and/or rating than having a like-type relationship with content. In particular embodiments, social-networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 902 may calculate a coefficient based on location information.

Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social-networking system 902 may determine that the user has a higher coefficient for the airport than the gas station based on the proximity of the airport to the user.

In particular embodiments, social-networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 902 may provide information that is relevant to user's interests and current circumstances, increasing the likelihood that they will find such information of interest. In particular embodiments, social-networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social-networking system 902 may calculate the coefficient (or access the coefficient information if it has previously been calculated and stored). In particular embodiments, social-networking system 902 may measure an affinity with respect to a particular process. Different processes (both internal and external to the online social network) may request a coefficient for a particular object or set of objects. Social-networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/979,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
receiving, at a social networking system, an electronic communication from a sender device and directed to a plurality of recipient devices;
determining, by at least one processor of the social networking system, that the electronic communication is related to a charitable cause;
evaluating, by the at least one processor, donation histories associated with a plurality of recipients associated with the plurality of recipient devices, the donation histories comprising a first donation history associated with a first recipient of the plurality of recipients and a second donation history associated with a second recipient of the plurality of recipients;
selecting, by the at least one processor:
a first set of distinct donation quantities to provide for display to the first recipient based on evaluating the first donation history associated with the first recipient; and
a second set of distinct donation quantities, different from the first set of distinct donation quantities, to provide for display to the second recipient based on evaluating the second donation history associated with the second recipient;
generating, from the electronic communication and based on determining that the electronic communication is related to a charitable cause, a first modified electronic communication comprising a first selectable option to contribute presented within the first modified electronic communication;
providing the first modified electronic communication to a first recipient device associated with the first recipient such that, in response to a selection of the first selectable option to contribute, the first recipient device displays the first set of distinct donation quantities within the first modified electronic communication;
generating, from the electronic communication and based on determining that the electronic communication is related to a charitable cause, a second modified electronic communication comprising a second selectable option to contribute within the second modified electronic communication; and
providing the second modified electronic communication to a second recipient device associated with the second recipient such that, in response to a selection of the second selectable option to contribute, the second recipient device displays the second set of distinct donation quantities within the second modified electronic communication.

2. The method of claim 1, wherein evaluating the donation histories associated with the plurality of recipients comprises:
evaluating previous donation quantities made by the first recipient and previous donation quantities made by the second recipient; and
evaluating donation histories of co-users associated with the first recipient and donation histories of co-users associated with the second recipient.

3. The method of claim 1, wherein evaluating the donation histories associated with the plurality of recipients comprises:
determining a charitable organization associated with the communication; and
evaluating previous donations received by the charitable organization.

4. The method of claim 1, wherein providing the first modified electronic communication to the first recipient device comprises providing the first modified electronic communication within a message feed of a social networking interface displayed on the first recipient device.

5. The method of claim 1, wherein:
the electronic communication comprises a video;
determining that the electronic communication is related to the charitable cause comprises analyzing the video to determine that the video is related to the charitable cause;
generating the first modified electronic communication comprises customizing the video to include the first selectable option to contribute; and
generating the second modified electronic communication comprises customizing the video to include the second selectable option to contribute.

6. The method of claim 1, wherein determining that the electronic communication is related to a charitable cause comprises matching a sender associated with the sender device of the electronic communication to a verified charity within a database of the social networking system.

7. The method of claim 1, wherein determining that the electronic communication is related to a charitable cause comprises analyzing communication content to determine content that matches key content within a database of the social networking system.

8. The method of claim 7, wherein analyzing the communication content comprises determining whether a quantity of communication content that matches key content within the database is sufficient to satisfy a threshold.

9. The method of claim 1, wherein selecting the first set of distinct donation quantities and the second set of distinct donation quantities comprises training a machine learning model to identify donation quantities that will increase one or more of a donation probability or a donation amount for individual recipients.

10. The method of claim 1, wherein providing the first modified electronic communication comprising providing the first modified electronic communication within a news feed of a social networking interface displayed on the first recipient device.

11. The method of claim 1, further comprising:
causing the first recipient device to display the first set of distinct donation quantities within a pop-up banner in response to a selection of the first selectable option to contribute.

12. The method of claim 1, wherein evaluating the donation histories comprises identifying contribution amounts that are most likely to lead to contributions by the first recipient and the second recipient.

13. The method of claim 12, wherein identifying contribution amounts that are most likely to lead to contributions by the first recipient and the second recipient comprises identifying amounts most frequently donated by the first recipient and the second recipient.

14. The method of claim 1, wherein a distinct donation quantity comprises a quantity of one or more of a currency, a time, or a number of volunteers.

15. The method of claim 1, wherein selecting the first set of distinct donation quantities comprises identifying a plurality of amounts likely to lead to a future contribution by the first recipient.

16. The method of claim 15, wherein identifying the plurality of amounts likely to lead to a future contribution comprises identifying, based on evaluating the donation histories, amounts similar to amounts previously donated by one or more co-users associated with the first recipient.

17. The method of claim 1, wherein generating the first modified electronic communication comprises:
determining performance histories of donation quantities within the first donation history; and
generating the first set of distinct donation quantities based on the performance histories of the donation quantities.

18. The method of claim 1, further comprising:
processing, based on a selection by the first recipient of a distinct donation quantity of the first set of distinct donation quantities, a transaction of the selected distinct donation quantity by applying, based on an approval of the first recipient, a transaction account associated with the first recipient to process the transaction of the selected distinct donation quantity.

19. A system comprising:
a computing device comprising a processor; and
software instructions that, when executed by the processor, cause the system to:
receive, at a social networking system, an electronic communication from a sender device and directed to a plurality of recipient devices;
determine, by at least one processor of the social networking system, that the electronic communication is related to a charitable cause;
evaluate, by the at least one processor, donation histories associated with a plurality of recipients associated with the plurality of recipient devices, the donation histories comprising a first donation history associated with a first recipient of the plurality of recipients and a second donation history associated with a second recipient of the plurality of recipients;
select, by the at least one processor:
a first set of distinct donation quantities to provide for display to the first recipient based on evaluating the first donation history associated with the first recipient; and
a second set of distinct donation quantities, different from the first set of distinct donation quantities, to provide for display to the second recipient based on evaluating the second donation history associated with the second recipient;
generate, from the electronic communication and based on determining that the electronic communication is related to a charitable cause, a first modified electronic communication comprising a first selectable option to contribute presented within the first modified electronic communication;
provide the first modified electronic communication to a first recipient device associated with the first recipient such that, in response to a selection of the first selectable option to contribute, the first recipient device displays the first set of distinct donation quantities within the first modified electronic communication;
generate, from the electronic communication and based on determining that the electronic communication is related to a charitable cause, a second modified electronic communication comprising a second selectable option to contribute within the second modified electronic communication; and
provide the second modified electronic communication to a second recipient device associated with the second recipient such that, in response to a selection of the second selectable option to contribute, the second recipient device displays the second set of distinct donation quantities within the second modified electronic communication.

20. A non-transitory computer readable storage medium having stored thereon computer-executable instructions that, when executed by a processor, cause a computer to:
receive, at a social networking system, an electronic communication from a sender device and directed to a plurality of recipient devices;
determine, by at least one processor of the social networking system, that the electronic communication is related to a charitable cause;
evaluate, by the at least one processor, donation histories associated with a plurality of recipients associated with the plurality of recipient devices, the donation histories comprising a first donation history associated with a first recipient of the plurality of recipients and a second donation history associated with a second recipient of the plurality of recipients;
select, by the at least one processor:
a first set of distinct donation quantities to provide for display to the first recipient based on evaluating the first donation history associated with the first recipient; and a second set of distinct donation quantities, different from the first set of distinct donation quantities, to provide for display to the second recipient based on evaluating the second donation history associated with the second recipient;

generate, from the electronic communication and based on determining that the electronic communication is related to a charitable cause, a first modified electronic communication comprising a first selectable option to contribute presented within the first modified electronic communication;

provide the first modified electronic communication to a first recipient device associated with the first recipient such that, in response to a selection of the first selectable option to contribute, the first recipient device displays the first set of distinct donation quantities within the first modified electronic communication;

generate, from the electronic communication and based on determining that the electronic communication is related to a charitable cause, a second modified electronic communication comprising a second selectable option to contribute within the second modified electronic communication; and provide the second modified electronic communication to a second recipient device associated with the second recipient such that, in response to a selection of the second selectable option to contribute, the second recipient device displays the second set of distinct donation quantities within the second modified electronic communication.

* * * * *